US008832113B2

(12) United States Patent
Tamura et al.

(10) Patent No.: US 8,832,113 B2
(45) Date of Patent: Sep. 9, 2014

(54) DATA MANAGEMENT APPARATUS AND SYSTEM

(75) Inventors: Masahisa Tamura, Kawasaki (JP);
Yasuo Noguchi, Kawasaki (JP);
Toshihiro Ozawa, Yokohama (JP);
Munenori Maeda, Yokohama (JP);
Takashi Watanabe, Kawasaki (JP);
Tatsuo Kumano, Kawasaki (JP); Ken Iizawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/572,259

(22) Filed: Aug. 10, 2012

(65) Prior Publication Data

US 2013/0066883 A1 Mar. 14, 2013

(30) Foreign Application Priority Data

Sep. 12, 2011 (JP) .................................. 2011-198772

(51) Int. Cl.
*G06F 7/00* (2006.01)
*G06F 17/30* (2006.01)

(52) U.S. Cl.
CPC ...... *G06F 17/3053* (2013.01); *G06F 17/30958* (2013.01); *G06F 17/30699* (2013.01); *G06F 17/30873* (2013.01); *G06F 17/30867* (2013.01)
USPC ........................................................ 707/747

(58) Field of Classification Search
USPC .......................... 707/652, 737, 741, 822, 827
See application file for complete search history.

(56) References Cited

U.S. PATENT DOCUMENTS

| 7,774,572 | B2 | 8/2010 | Yokohata et al. |
| 2004/0024720 | A1* | 2/2004 | Fairweather .................... 706/46 |
| 2006/0123010 | A1* | 6/2006 | Landry et al. ................... 707/10 |
| 2007/0143274 | A1* | 6/2007 | Uppala ............................ 707/4 |
| 2007/0165619 | A1* | 7/2007 | Reinefeld et al. ............. 370/368 |
| 2007/0282915 | A1* | 12/2007 | Vosshall et al. ............... 707/200 |
| 2008/0228779 | A1 | 9/2008 | Mabuchi et al. |
| 2008/0320053 | A1* | 12/2008 | IIjima et al. ................... 707/201 |
| 2009/0132543 | A1* | 5/2009 | Chatley et al. .................. 707/10 |
| 2009/0248874 | A1* | 10/2009 | Karger et al. .................. 709/226 |
| 2010/0076930 | A1* | 3/2010 | Vosshall et al. ............... 707/638 |
| 2010/0241629 | A1* | 9/2010 | Tatemura et al. ............. 707/741 |
| 2010/0332451 | A1* | 12/2010 | Vosshall et al. ............... 707/634 |
| 2011/0004638 | A1* | 1/2011 | Nishiyama .................... 707/812 |
| 2011/0016127 | A1* | 1/2011 | Uppala .......................... 707/737 |
| 2011/0060887 | A1* | 3/2011 | Thatcher et al. ............. 711/171 |
| 2011/0099155 | A1* | 4/2011 | Shau et al. .................... 707/693 |

(Continued)

FOREIGN PATENT DOCUMENTS

| JP | 2007-323668 | 12/2007 |
| JP | 2008-233968 | 10/2008 |
| JP | 4281658 | 6/2009 |
| JP | 4418286 | 2/2010 |

*Primary Examiner* — Robert Beausoliel, Jr.
*Assistant Examiner* — Nicholas Allen
(74) *Attorney, Agent, or Firm* — Fujitsu Patent Center

(57) ABSTRACT

A data management apparatus sends specific data and key information corresponding to the specific data to another apparatus, when executing a process to change a storage destination of the specific data in which the hash value obtained by applying a predetermined hash function to corresponding key information belongs to a certain range, from the data management apparatus to the other apparatus, and sends the identification information of the other apparatus stored in correspondence with the certain range to a request source of an operation request, when the operation request with respect to data corresponding to key information is received after the process.

20 Claims, 24 Drawing Sheets

(56) References Cited

U.S. PATENT DOCUMENTS

| | | | |
|---|---|---|---|
| 2011/0202927 A1* | 8/2011 | Miloushev et al. | 718/104 |
| 2011/0307533 A1* | 12/2011 | Saeki | 707/822 |
| 2011/0307736 A1* | 12/2011 | George et al. | 714/6.2 |
| 2011/0320451 A1* | 12/2011 | Boh et al. | 707/737 |
| 2012/0011340 A1* | 1/2012 | Flynn et al. | 711/171 |
| 2012/0036163 A1* | 2/2012 | Myers et al. | 707/797 |
| 2012/0159102 A1* | 6/2012 | Kan | 711/162 |
| 2012/0185437 A1* | 7/2012 | Pavlov et al. | 707/652 |
| 2012/0233228 A1* | 9/2012 | Barton et al. | 707/827 |
| 2012/0233522 A1* | 9/2012 | Barton et al. | 714/758 |

* cited by examiner

FIG.6

| SEGMENTED RANGE | SERVER NAME |
|---|---|
| $0 \leqq HV < 10$ | C |
| $10 \leqq HV < 20$ | A |
| $20 \leqq HV < 30$ | A |
| $30 \leqq HV < 40$ | A |
| $40 \leqq HV < 50$ | B |
| $50 \leqq HV < 60$ | B |
| $60 \leqq HV < 70$ | A |
| $70 \leqq HV < 80$ | C |
| $80 \leqq HV < 90$ | A |
| $90 \leqq HV < 100$ | B |

FIG.7

| SEGMENTED RANGE | VERSION | SERVER NAME |
|---|---|---|
| 0 ≦ HV < 10 | 1 | C |
| 10 ≦ HV < 20 | 10 | A |
| 20 ≦ HV < 30 | 13 | A |
| 30 ≦ HV < 40 | 2 | A |
| 40 ≦ HV < 50 | 1 | B |
| 50 ≦ HV < 60 | 3 | B |
| 60 ≦ HV < 70 | 4 | A |
| 70 ≦ HV < 80 | 5 | C |
| 80 ≦ HV < 90 | 1 | A |
| 90 ≦ HV < 100 | 3 | B |

| SERVER NAME | VERSION | TOTAL CAPACITY | VACANT CAPACITY |
|---|---|---|---|
| A | 120 | 100[TB] | 20[TB] |
| B | 109 | 100[TB] | 30[TB] |
| C | 32 | 120[TB] | 40[TB] |

| SEGMENTED RANGE | NUMBER OF DATA | TOTAL AMOUNT OF DATA |
|---|---|---|
| $10 \leq HV < 20$ | 120 | 48072[GB] |
| $20 \leq HV < 30$ | 10 | 2102[GB] |
| $30 \leq HV < 40$ | 59 | 24210[GB] |
| $60 \leq HV < 70$ | 31 | 8308[GB] |
| $80 \leq HV < 90$ | 8 | 10[GB] |

| SEGMENTED RANGE | VERSION | COVERING SERVER |
|---|---|---|
| $0 \leq HV < 10$ | 1 | C |
| $10 \leq HV < 20$ | 11 | A→C |
| $20 \leq HV < 30$ | 13 | A |
| $30 \leq HV < 40$ | 2 | A |
| $40 \leq HV < 50$ | 1 | B |
| $50 \leq HV < 60$ | 3 | B |
| $60 \leq HV < 70$ | 4 | A |
| $70 \leq HV < 80$ | 5 | C |
| $80 \leq HV < 90$ | 1 | A |
| $90 \leq HV < 100$ | 3 | B |

| SEGMENTED RANGE | VERSION | COVERING SERVER |
|---|---|---|
| $0 \leq HV < 10$ | 1 | C |
| $10 \leq HV < 20$ | 12 | C |
| $20 \leq HV < 30$ | 13 | A |
| $30 \leq HV < 40$ | 2 | A |
| $40 \leq HV < 50$ | 1 | B |
| $50 \leq HV < 60$ | 3 | B |
| $60 \leq HV < 70$ | 4 | A |
| $70 \leq HV < 80$ | 5 | C |
| $80 \leq HV < 90$ | 1 | A |
| $90 \leq HV < 100$ | 3 | B |

FIG.18

| SEGMENTED RANGE | NUMBER OF DATA | TOTAL AMOUNT OF DATA |
|---|---|---|
| 10 ≦ HV < 15 | 58 | 20002[GB] |
| 15 ≦ HV < 20 | 62 | 28070[GB] |
| 20 ≦ HV < 30 | 10 | 2102[GB] |
| 30 ≦ HV < 40 | 59 | 24210[GB] |
| 60 ≦ HV < 70 | 31 | 8308[GB] |
| 80 ≦ HV < 90 | 8 | 10[GB] |

14a

AFTER SEGMENTING

FIG.19

| SEGMENTED RANGE | VERSION | SERVER NAME |
|---|---|---|
| 0 ≦ HV < 10 | 1 | C |
| 10 ≦ HV < 15 | 11 | A |
| 15 ≦ HV < 20 | 11 | A |
| 20 ≦ HV < 30 | 13 | A |
| 30 ≦ HV < 40 | 2 | A |
| 40 ≦ HV < 50 | 1 | B |
| 50 ≦ HV < 60 | 3 | B |
| 60 ≦ HV < 70 | 4 | A |
| 70 ≦ HV < 80 | 5 | C |
| 80 ≦ HV < 90 | 1 | A |
| 90 ≦ HV < 100 | 3 | B |

12a

AFTER SEGMENTING

FIG.21

| SEGMENTED RANGE | HIERARCHICAL LAYER 1 | | HIERARCHICAL LAYER 2 | |
|---|---|---|---|---|
| | VERSION | COVERING SERVER | VERSION | COVERING SERVER |
| $0 \leq HV < 10$ | 3 | D | 1 | C |
| $10 \leq HV < 20$ | 8 | D | 10 | A |
| $20 \leq HV < 30$ | 23 | A | 13 | A |
| $30 \leq HV < 40$ | 12 | A | 2 | A |
| $40 \leq HV < 50$ | 44 | D | 1 | B |
| $50 \leq HV < 60$ | 31 | B | 3 | B |
| $60 \leq HV < 70$ | 3 | D | 4 | A |
| $70 \leq HV < 80$ | 9 | D | 5 | C |
| $80 \leq HV < 90$ | 5 | A | 1 | A |
| $90 \leq HV < 100$ | 10 | B | 3 | B |

FIG.22

| SERVER NAME | HIERARCHICAL LAYER 1 | | | HIERARCHICAL LAYER 2 | | |
|---|---|---|---|---|---|---|
| | VERSION | TOTAL CAPACITY | VACANT CAPACITY | VERSION | TOTAL CAPACITY | VACANT CAPACITY |
| A | 2120 | 10[TB] | 2[TB] | 120 | 100[TB] | 20[TB] |
| B | 1109 | 10[TB] | 3[TB] | 109 | 100[TB] | 30[TB] |
| C | - | - | - | 32 | 120[TB] | 40[TB] |
| D | 609 | 20[TB] | 8[TB] | - | - | - |

FIG.23

| SEGMENTED RANGE | HIERARCHICAL LAYER 1 | | HIERARCHICAL LAYER 2 | |
|---|---|---|---|---|
| | NUMBER OF DATA | TOTAL AMOUNT OF DATA | NUMBER OF DATA | TOTAL AMOUNT OF DATA |
| $10 \leq HV < 20$ | - | - | 120 | 48072[GB] |
| $20 \leq HV < 30$ | 43 | 2102[GB] | 10 | 2102[GB] |
| $30 \leq HV < 40$ | 3 | 24210[GB] | 59 | 24210[GB] |
| $60 \leq HV < 70$ | - | - | 31 | 8308[GB] |
| $80 \leq HV < 90$ | 17 | 10[GB] | 8 | 10[GB] |

14a

DATA MANAGEMENT APPARATUS AND SYSTEM

CROSS-REFERENCE TO RELATED APPLICATIONS

This application is based upon and claims the benefit of priority of the prior Japanese Patent Application No. 2011-198772, filed on Sep. 12, 2011, the entire contents of which are incorporated herein by reference.

FIELD

The embodiments discussed herein are related to a data management apparatus, a data management system, a data management method, and a computer-readable storage medium having stored therein a program for causing a computer to execute a data management process.

BACKGROUND

KVS (Key-Value Store) refers to a database technique or database that provides a function corresponding to associative array in programming languages. In other words, the KVS manages a set of key and data, by making an arbitrary key correspond to the data (or value) that is a management target. An access to the data may be made by specifying the key. Distributed KVS refers to a format in which a placement location of the set of key and data is distributed to a plurality of nodes.

In the distributed KVS, the space (hereinafter referred to as "hash space") in which hash values of the keys are mapped is segmented and allocated to each of the nodes. Consistent hashing is one known method of segmenting the hash space. According to the consistent hashing, a range (hereinafter referred to as "covering range") covered by each node within the hash space is determined by the hash value of an identification name (for example, server name) of each node. For example, suppose that three nodes A, B, and C exist, and that the hash value of the server name of the node A is "10", the hash value of the server name of the node B is "40", and the hash value of the server name of the node C is "90". A total range of the hash space may be regarded to be greater than or equal to 0 and less than or equal to 100.

In this case, the covering range (or responsible range) of the node A is greater than or equal to 10 and less than 40. The covering rage of the node B is greater than or equal to 40 and less than 90. The covering range of the node C is greater than or equal to 90 and less than 100, and greater than or equal to 0 and less than 10. This state of the nodes A, B, and C may be represented as illustrated in FIG. 1, for example.

FIG. 1 is a diagram illustrating an example of segmenting the hash space based on the consistent hashing. A circumference H in FIG. 1 illustrates the hash space that is the management target. Circles labeled A, B, and C on the circumference H denote the nodes A, B, and C. A range Ha denotes the covering rage of the node A, a range Hb denotes the covering range of the node B, and a range Hc denotes the covering range of the node C.

A client computes the hash value of the key of the data that is the access target, and issues an access request with respect to the node that includes the hash value within the covering range thereof.

The applicants are aware of Japanese Laid-Open Patent Publications No. 2008-233968, No. 2006-92322 (or Japanese Patent No. 4281658), No. 2007-323668, and No. 2005-50303 (or Japanese Patent No. 4418286).

In the case of the consistent hashing, the covering range of each node is fixedly determined based on the server name and the like of each node. For this reason, as may be seen from FIG. 1, a relatively large unbalance may occur in the sizes of the covering ranges among the nodes. As a result, a state may easily occur in which the data or the load concentrates at a certain node, however, such a state may be difficult to cure.

SUMMARY

Accordingly, it is an object in one aspect of the embodiment to provide a data management apparatus, a data management system, a data management method, and a computer-readable storage medium, that may improve the flexibility of the data arrangement in the distributed KVS.

According to one aspect of the present invention, a data management apparatus operable in a distributed management system to distributively manage data, may include a first storage part configured to store key information in which a hash value obtained by applying a predetermined hash function to the key information belongs to a first range, and data corresponding to the key information, in a related manner; a second storage part configured to store identification information of another data management apparatus in correspondence with a certain range, when executing a changing process; and a processing unit configured to execute a process including first sending specific data included in the data stored in the first storage part and key information corresponding to the specific data to the other data management apparatus, when executing the changing process to change a storage destination of the specific data in which the hash value obtained by applying the predetermined hash function to corresponding key information belongs, from the data management apparatus to the other data management apparatus; and second sending the identification information of the other data management apparatus stored in correspondence with the certain range to a request source of an operation request, when the operation request with respect to data corresponding to first key information is received after the changing process and a hash value obtained by applying the predetermined hash function to the first key information belongs to the certain range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a structure of an arrangement information storage part in a client apparatus;

FIG. 7 is a diagram illustrating an example of a structure of an arrangement information storage part in the server apparatus;

FIG. 8 is a diagram illustrating an example of a structure of a server information storage part;

FIG. 9 is a diagram illustrating an example of a structure of a covering range information storage part;

FIG. 11 is a diagram illustrating an example of the arrangement information storage part during rearrangement;

FIG. 12 is a diagram illustrating an example of the arrangement information storage part after the rearrangement;

FIG. 18 is a diagram illustrating an example of the covering range information storage part after the segmenting of the segmented range;

FIG. 19 is a diagram illustrating an example of the arrangement information storage part after the segmenting of the segmented range;

FIG. 21 is a diagram illustrating an example of the structure of the arrangement information storage part in the third embodiment;

FIG. 22 is a diagram illustrating an example of the structure of the server information storage part in the third embodiment;

FIG. 23 is a diagram illustrating an example of the structure of the covering range information storage part in the third embodiment;

DESCRIPTION OF EMBODIMENTS

Preferred embodiments of the present invention will be described with reference to the accompanying drawings.

A description will now be given of the data management apparatus, the data management system, the data management method, and the computer-readable storage medium in each embodiment according to the present invention.

Figure 1:
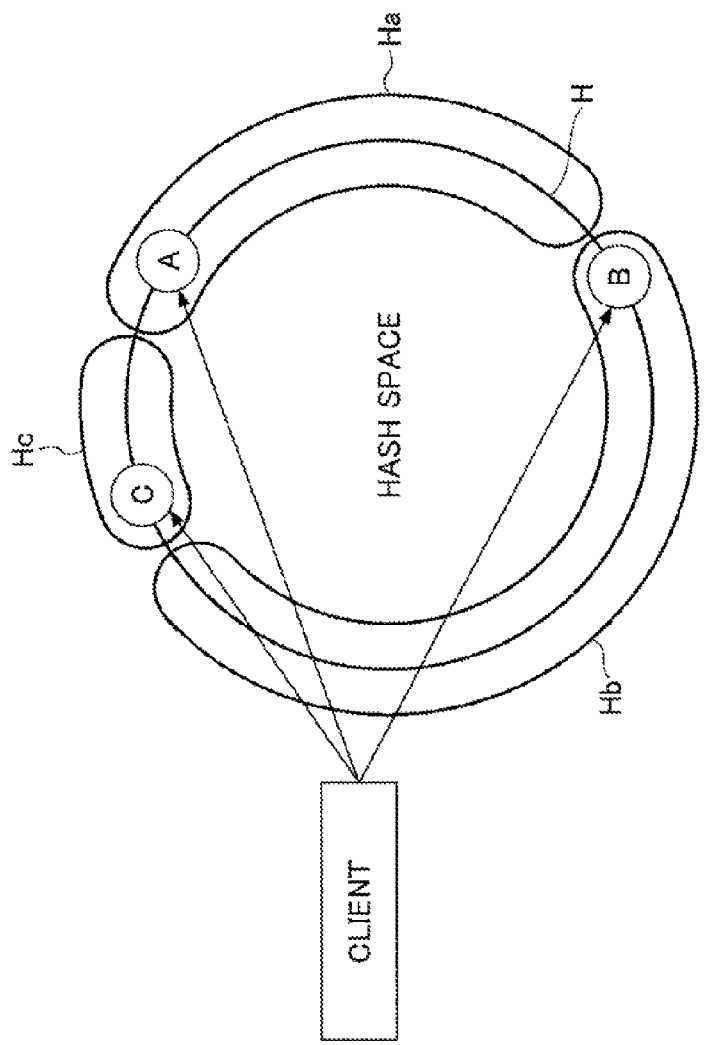
FIG. 1 is a diagram illustrating an example of segmenting the hash space based on the consistent hashing.
Figure 2:
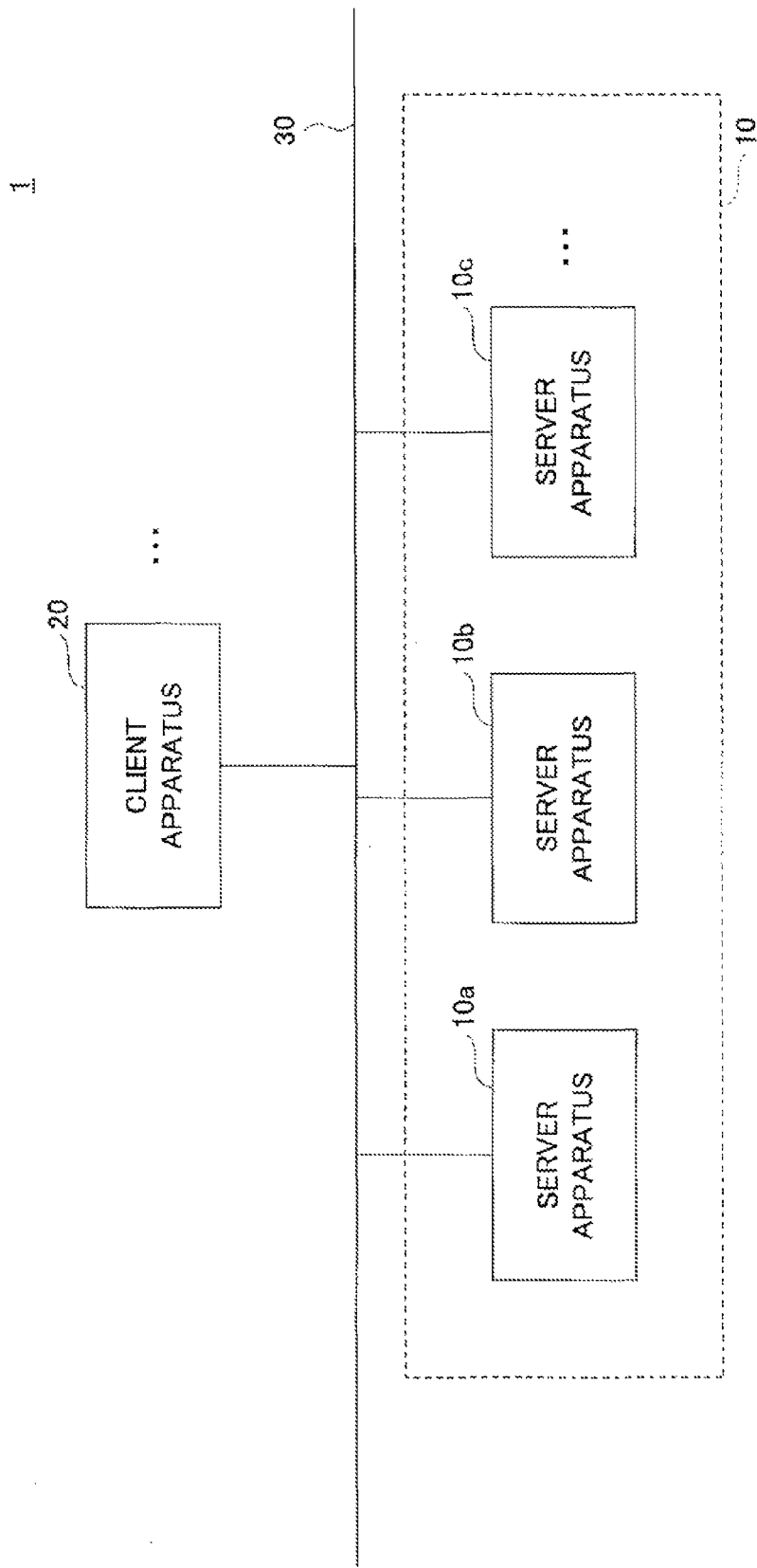
FIG. 2 is a diagram illustrating an example of a structure of a data management system in one embodiment of the present invention.

FIG. 2 is a diagram illustrating an example of a structure of a data management system in one embodiment of the present invention. In FIG. 2, a data management system 1 may include a plurality of server apparatuses 10, and at least one client apparatus 20. The plurality of server apparatuses 10 may include server apparatuses 10a, 10b, 10c, . . . . Each server apparatus 10 and the at least one client apparatus 20 may communicate via a network 30, such as a LAN (Local Area Network), the Internet, and the like. The network 30 may be formed by a cable network, a wireless network, or a combination of cable and wireless networks.

The data management system 1 may be formed by a computer system that functions as the distributed KVS. In other words, the data management system 1 may manage a plurality of sets of keys and data (or values) in a manner distributed over the plurality of server apparatuses 10.

Each server apparatus 10 may be an example of a data managing node that may function as a KVS. Each server apparatus 10 may manage (or store) sets of keys and data belonging to the range of the hash space (hereinafter referred to as "covering range") allocated to the server apparatus 10. The key may correspond to identification information or label of the data. Information that enables identification of each data, such as a data name, a file name, a data ID, and the like, for example, may be used as the key. The type of data is not limited to a predetermined type. Various types of data, such as numerical values, characters, character strings, document data, image data, movie (or dynamic image) data, audio data, other electronic data, and the like, for example, may be the management target.

The hash space may refer to the space in which the hash values, obtained by applying a predetermined hash function with respect to the keys, are mapped. Alternatively, the hash space may be regarded as a range of the hash values. In this embodiment, the hash space is segmented into a number greater than the number of server apparatuses 10. For example, when the number of server apparatuses 10 is three (3), the hash space may be segmented into four (4) or more ranges. Each range (hereinafter referred to as "segmented range") obtained after the segmenting of the hash space may be allocated to each server apparatus 10 according to an arbitrary method. In other words, in this embodiment, the covering range of the server apparatus 10 is not determined based on the identification information (for example, server name) of the server apparatus 10, and first, the hash space may be segmented into the segmented ranges, and the segmented ranges may be allocated to each of the server apparatuses 10. Because the hash space may be segmented into a number of segmented ranges greater than the number of server apparatuses 10, there may exist a server apparatus 10 to which two or more segmented ranges are allocated as the covering range thereof.

The client apparatus 20 may be formed by a computer that utilizes the data managed by each of the server apparatuses 10.

Figure 3:
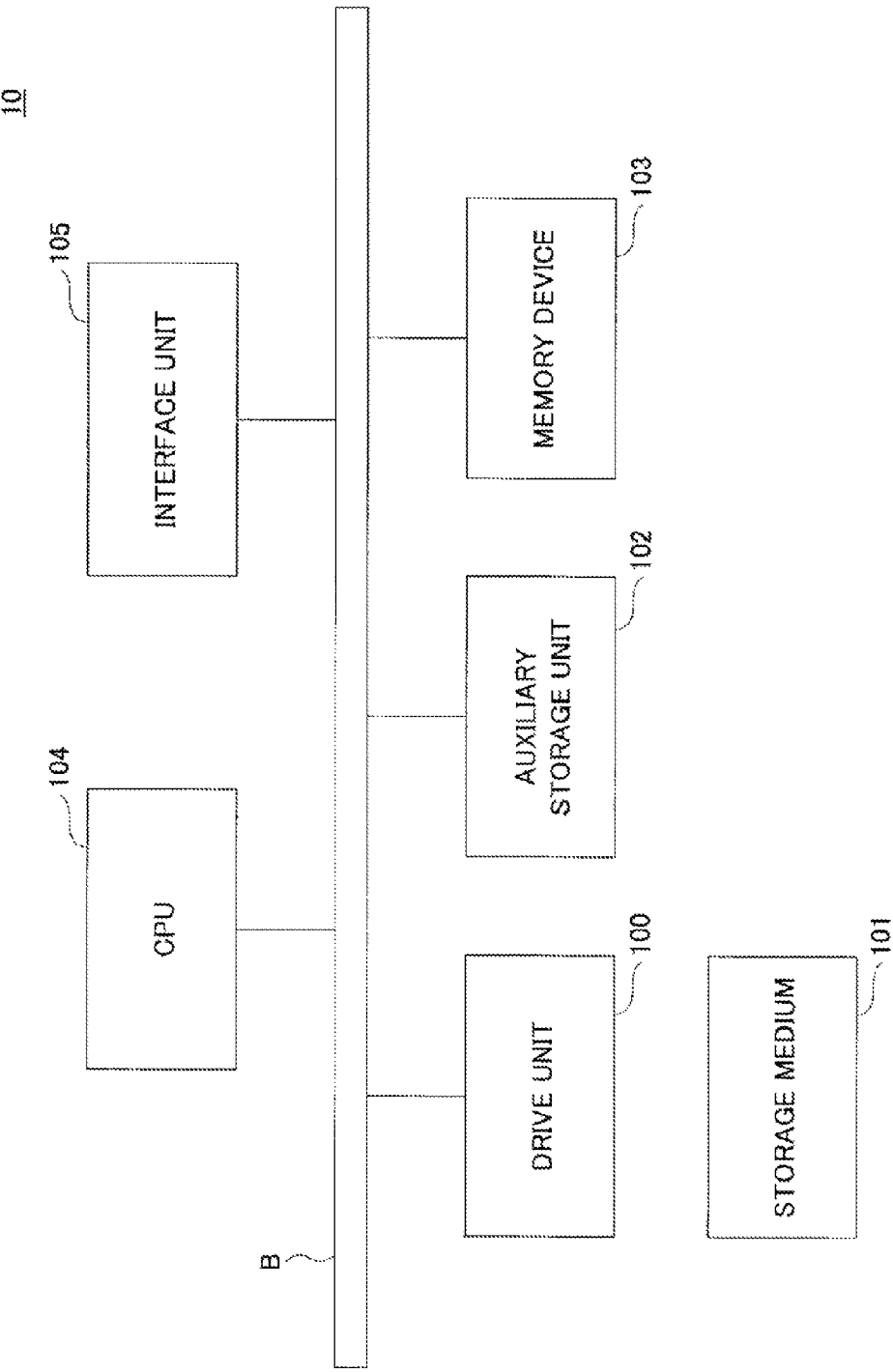
FIG. 3 is a diagram illustrating an example of a hardware structure of a server apparatus in one embodiment of the present invention.

FIG. 3 is a diagram illustrating an example of a hardware structure of the server apparatus in one embodiment of the present invention. The server apparatus 10 illustrated in FIG. 3 may include a drive unit 100, an auxiliary storage unit 102, a memory device 103, a CPU (Central Processing Unit) 104, and an interface unit 105 that are mutually connected via a bus B.

A program for realizing a process in the server apparatus 10 may be provided by a non-transitory computer-readable storage medium 101. When the storage medium 101 that stores the program is set in the drive unit 100, the program is read from the storage medium 101 by the drive unit 100 and installed into the auxiliary storage unit 102. The installing of the program is not limited to that from the storage medium 101, and the program may be downloaded from another computer via a network. The auxiliary storage unit 102 stores the program installed therein, files, data and the like that may be preferred.

The memory device 103 may store the program read from the auxiliary storage unit 102 when a program start instruction is issued. The CPU 104 executes the program stored in the memory device 103 in order to realize the functions of the server apparatus 10. The interface unit 105 may be used as an interface to connect the server apparatus 10 to the network.

Examples of the storage medium 101 may include portable storage media such as a CD-ROM (Compact Disk-Read Only Memory), a DVD (Digital Versatile Disk), a USB (Universal Serial Bus) memory, and the like. In addition, examples of the auxiliary storage unit 102 may include a HDD (Hard Disk Drive), a flash memory, and the like. Each of the storage medium 101 and the auxiliary storage unit 102 may form a non-transitory computer-readable storage medium.

The client apparatus 20 may have a hardware structure similar to the hardware structure of the server apparatus 10 illustrated in FIG. 3. However, in a case in which the client apparatus 20 is directly operated by a user, the client apparatus 20 is preferably connected to an input device such as a keyboard, a mouse, and the like, and to a display unit such as a LCD (Liquid Crystal Display), and the like.

Figure 4:
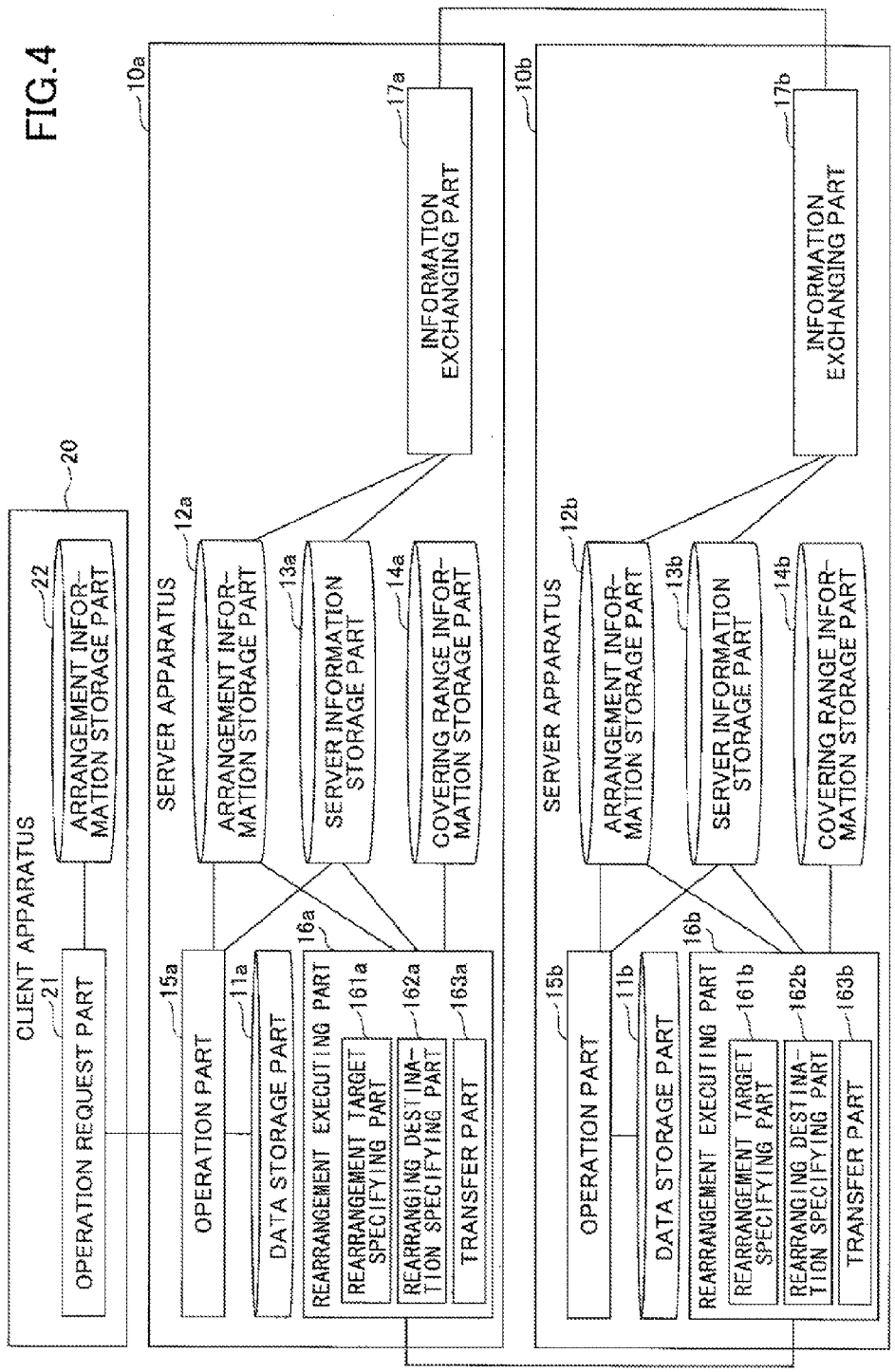
FIG. 4 is a diagram illustrating an example of a functional structure of the data management system in a first embodiment.

FIG. 4 is a diagram illustrating an example of a functional structure of the data management system in a first embodiment. The client apparatus 20 illustrated in FIG. 4 may include a operation request part 21 and an arrangement information storage part 22.

The operation request part 21 may request an operation on the data with respect to the server apparatus 10. Examples of the operation on the data include Put and Get. The Put operation on the data refers to the writing of the data, and the Get operation on the data refers to the acquiring of the data. For example, the operation request part 21 may be realized when the program installed in the client apparatus 20 causes a CPU of the client apparatus 20 to execute the process.

The arrangement information storage part 22 stores identification information (hereinafter referred to as "server name") of the server apparatus 10 corresponding to the segmented range (including the segmented range in the covering range), for each of the segmented ranges. For example, the arrangement information storage part 22 may be realized using an auxiliary storage unit of the client apparatus 20.

Each server apparatus 10 may include a data storage part 11, an arrangement information storage part 12, a server information storage part 13, and a covering range information storage part 14. Each of the storage parts 11 through 14 may be realized using the auxiliary storage unit 102, for example. The storage parts 12, 13, and 14 may be realized using a storage unit that is connected to the server apparatus 10 via the network.

The data storage part 11 may store the sets of keys and data. The arrangement information storage part 12 may store the server name of the server apparatus 10 corresponding to the segmented range, for each of the segmented ranges. The server information storage part 13 may store information (for example, vacant capacity, etc.) indicating the state of the data storage part 11 of each server apparatus 10. The covering range information storage part 14 may store information indicating an arrangement state (number of data, amount of data, etc.) of the data, for each of the segmented ranges belonging to the covering range.

Each server apparatus 10 may include an operation part 15, a rearrangement executing part 16, and an information exchanging part 17.

The operation part 15 executes a process according to the operation request (Put request, Get request, etc.) from the client apparatus 20 to operate on the data. More particularly, when the Put request is received, the operation part 15 stores the set of key and data specified by the Put request into the data storage part 11. In addition, when the Get request is received, the operation part 15 acquires from the data storage part 11 the data corresponding to the key specified by the Get request, and returns the acquired data to the client apparatus 20.

When the data arrangement is biased to some of the segmented ranges within the covering range of the server apparatus 10, the rearrangement executing part 16 of this server apparatus 10 may execute a process to change (or rearrange) the coverage of the biased segmented ranges to another server apparatus 10. The changing (or rearrangement) of the coverage of the segmented ranges means the rearrangement of the data belonging to the segmented ranges. In FIG. 4, the rearrangement executing part 16 may include a rearrangement target specifying part 161, a rearranging destination specifying part 162, and a transfer part 163. The rearrangement target specifying part 161 may specify the segmented range that is the rearrangement target. For example, the rearrangement target specifying part 161 may specify, as the rearrangement target, the segmented range in which the amount of data is relatively large. The rearranging destination specifying part 162 may judge (or specify) the server apparatus 10 that is the rearranging destination with respect to the segmented range that is the rearrangement target. For example, the rearranging destination specifying part 162 may specify, as the rearranging destination, another server apparatus 10 having a vacant capacity larger than that of the server apparatus 10 to which the rearranging destination specifying part 162 belongs. The transfer part 163 may transfer the sets of keys and data belonging to the segmented range that is the rearrangement target, to the server apparatus 10 at the rearranging destination.

The information exchanging part 17 may regularly exchange the information stored in the arrangement information storage part 12 and the information stored in the server information storage part 13 with another server apparatus, or exchange the information when the information is updated. Hence, the states of the arrangement information storage 12 and the server information storage part 13 within each server apparatus 10 may be synchronized by the information exchanging part 17.

In FIG. 4, only the server apparatuses 10a and 10b are illustrated. However, the server apparatus 10c, and the like may have functions similar to those the server apparatuses 10a and 10b. In the following description, when a reference is made to a particular server apparatus 10 or to the constituent elements of the particular server apparatus 10, the particular server apparatus 10 or the constituent elements thereof will be referred to by the above described reference numerals with a suffix "a", "b", "c", . . . identical to the suffix added to the reference numeral "10" designating the server apparatus.

Figure 5:
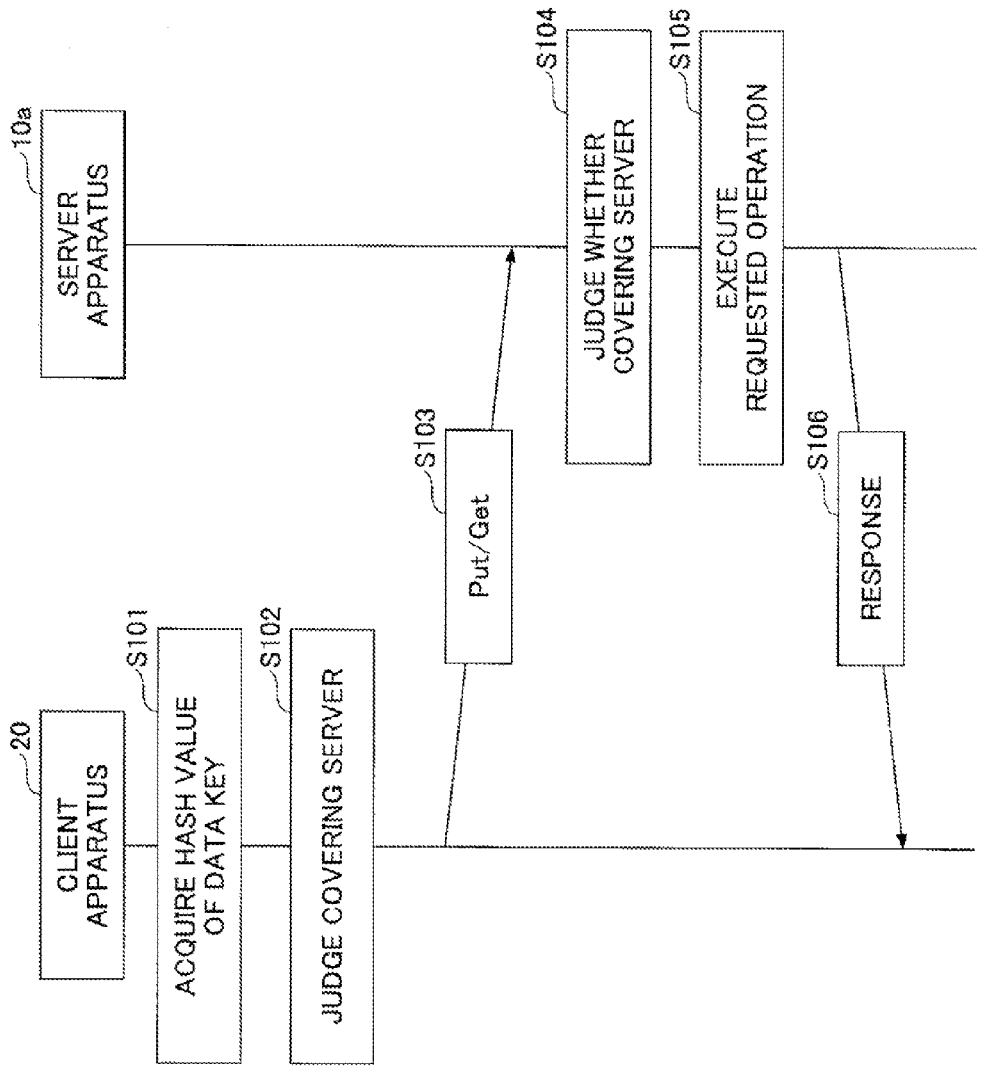
FIG. 5 is a sequence diagram for explaining a basic processing procedure of a data operation process.

Next, a description will be given of a processing procedure executed by the data management system 1. FIG. 5 is a sequence diagram for explaining a basic processing procedure of a data operation process.

In the client apparatus 20, when an operation (Put or Get) is to be performed on the data, the operation request part 21 may apply a predetermined hash function with respect to the key (hereinafter referred to as "data key") of the data that is the operation target, and acquire (or computes) a hash value with respect to the data key (step S101). Next, the operation request part 21 may refer to the arrangement information storage part 22, and judge the server apparatus (or covering server) 10 that stores the data that is the operation target (step S102).

FIG. 6 is a diagram illustrating an example of a structure of the arrangement information storage part in the client apparatus. As illustrated in FIG. 6, the arrangement information storage part 22 may store the server name of the server apparatus (or covering server of the segmented range) 10 including in the covering range thereof the range of the hash value in the segmented range and the segmented range, for each of the segmented ranges. In FIG. 6 and FIGS. 7, 9, 11, 12, 18, 19, 21, and 23, HV denotes the hash value.

Accordingly, the operation request part 21 may judge the server name corresponding to the segmented range in which the hash value acquired in the step S101 is included, by referring to the arrangement information storage part 22. In this example, it is assumed for the sake of convenience that the server apparatus 10a is judged as being the covering server. In this embodiment, the server names of the server apparatuses 10a, 10b, and 10c are "A", "B", and "C", respectively.

Next, the operation request part 21 may send an operation request (Put request or Get request) to operate on the data that is the operation target, with respect to the server apparatus 10a that is the covering server (step S103). The Put request may specify the data key and the data that is the writing (or registering) target. The Get request may specify the data key of the data that is the acquiring target.

The operation part 15a of the server apparatus 10a that receives the operation request may refer to the arrangement information storage part 12a, in order to judge whether the server apparatus 10a is the covering server for the segmented range to which the data that is the operation target of the operation request belongs (step S104). In other words, the step S104 may judge whether the data that is the operation target of the operation request is arranged in the server apparatus 10a.

FIG. 7 is a diagram illustrating an example of a structure of the arrangement information storage part in the server apparatus. As illustrated in FIG. 7, the arrangement information storage part 12a may additionally include an item (or column) related to a version, with respect to the arrangement information storage part 22 illustrated in FIG. 6. The version may refer to information that is incremented by "1" every time the corresponding relationship between the segmented range and the server name (or covering server) changes (that is, every time the rearrangement of the segmented range is executed). During execution of the rearrangement of the segmented range, the version may be updated to a value to indicate that the rearrangement is being executed. Hence, the version may be used to judge whether the rearrangement is being executed with respect to the segmented range. In FIG. 7, the arrangement information storage part 12a is illustrated as an example, however, stored contents of the arrangement information storage part 12 of each of the server apparatuses 10 basically match, because the server apparatuses 10 are synchronized by the information exchanging part 17.

The operation part 15a may compute the hash value by applying the predetermined hash function with respect to the data key specified by the operation request, and specify the server name corresponding to the segmented range in which the hash value is included in the arrangement information storage part 12a, in order to judge whether the server apparatus 10a is the covering server. In other words, when the server name of the segmented range in which the hash value is included is "A", the operation part 15a may judge that the server apparatus 10a is the covering server.

When the server apparatus 10a is the covering server, the operation part 15a may execute a process according to the operation request (step S105). When the operation request is the Put request, the operation part 15a may store the set of the data key and the data specified by the Put request in the data storage part 11a. In this state, when data corresponding to the specified data key is stored in the data storage part 11a, the data stored in the data storage part 11a may be updated (or overwritten) by the data specified by the Put request. On the other hand, when the operation request is the Get request, the operation part 15a may acquire from the data storage part 11a the data corresponding to the data key specified by the Get request.

When the operation request is the Put request, the operation part 15a may update the information stored in the server information storage part 13a and the information stored in the covering range information storage part 14a of the server apparatus 10 when preferred.

FIG. 8 is a diagram illustrating an example of a structure of the server information storage part. As illustrated in FIG. 8, the server information storage part 13a may store the server name, the version, the total capacity, the vacant capacity, and the like for each of the server apparatuses 10 included in the data management system 1. The version may be formed by a parameter having a value that increases when the total capacity, the vacant capacity, and the like are updated. In other words, the version may be formed by a parameter that indicates how new the record in the server information storage part 13a is. The total capacity may indicate the capacity of the data storage part 11 of each server apparatus 10. That is, the total capacity may indicate a maximum value (or upper limit value) of the amount of data that may be managed (or stored) in each server apparatus 10. The vacant capacity may indicate the vacant capacity of the data store part 11 or each server apparatus 10. In FIG. 8, server information storage part 13a is illustrated as an example, however, stored contents of the server information storage part 13 of each of the server apparatuses 10 basically match, because the server apparatuses 10 are synchronized by the information exchanging part 17.

When the data according to the Put request is written and the vacant capacity of the data storage part 11a in the server apparatus 10a changes, the operation part 15a may update the value of the vacant capacity of the record in the server information storage part 13a with respect to the server apparatus 10a to the value after the change. The contents of the record after the updating may be notified (or transferred) to another server apparatus 10 by the information exchanging part 17a. The timing of this notification (or transfer) may be regular, dependent on the updating, or a combination of the two. In addition, the notification (or transfer) to the other server apparatus 10 may be multicast, or transferred in a sequence on a virtual ring topology.

FIG. 9 is a diagram illustrating an example of a structure of the covering range information storage part. FIG. 9 illustrates the stored contents of the covering range information storage part 14a in the server apparatus 10a. The covering range information storage part 14 of other server apparatuses 10 have a structure similar to that of the covering range information storage part 14a, however, the stored contents differ depending on the covering range of each server apparatus 10.

The covering range information storage part 14a illustrated in FIG. 9 stores the range of the hash value HV in the segmented range, the number of data, and the total amount of data, for each segmented range included in the covering range of the server apparatus 10a. The number of data may refer to the number of data of the hash value of the data key, belonging to the segmented range. The total amount of data may refer to the total data size (or total amount) of the data of the hash value of the data key, belonging to the segmented range.

When the number of data and the total amount of data in the segmented range in which the data specified by the Put request is written (or arranged) change due to the writing of the data, the operation part 15a may update the values of the number of data and the total amount of data in the covering range information storage part 14a with respect to the segmented range.

Next, the operation part 15a may return a response with respect to the operation request to the client apparatus 20 at the operation request source (step S106). With respect to the Put request, information indicating whether the writing of the data is successful is returned. With respect to the Get request, the acquired data is returned.

Figure 10:
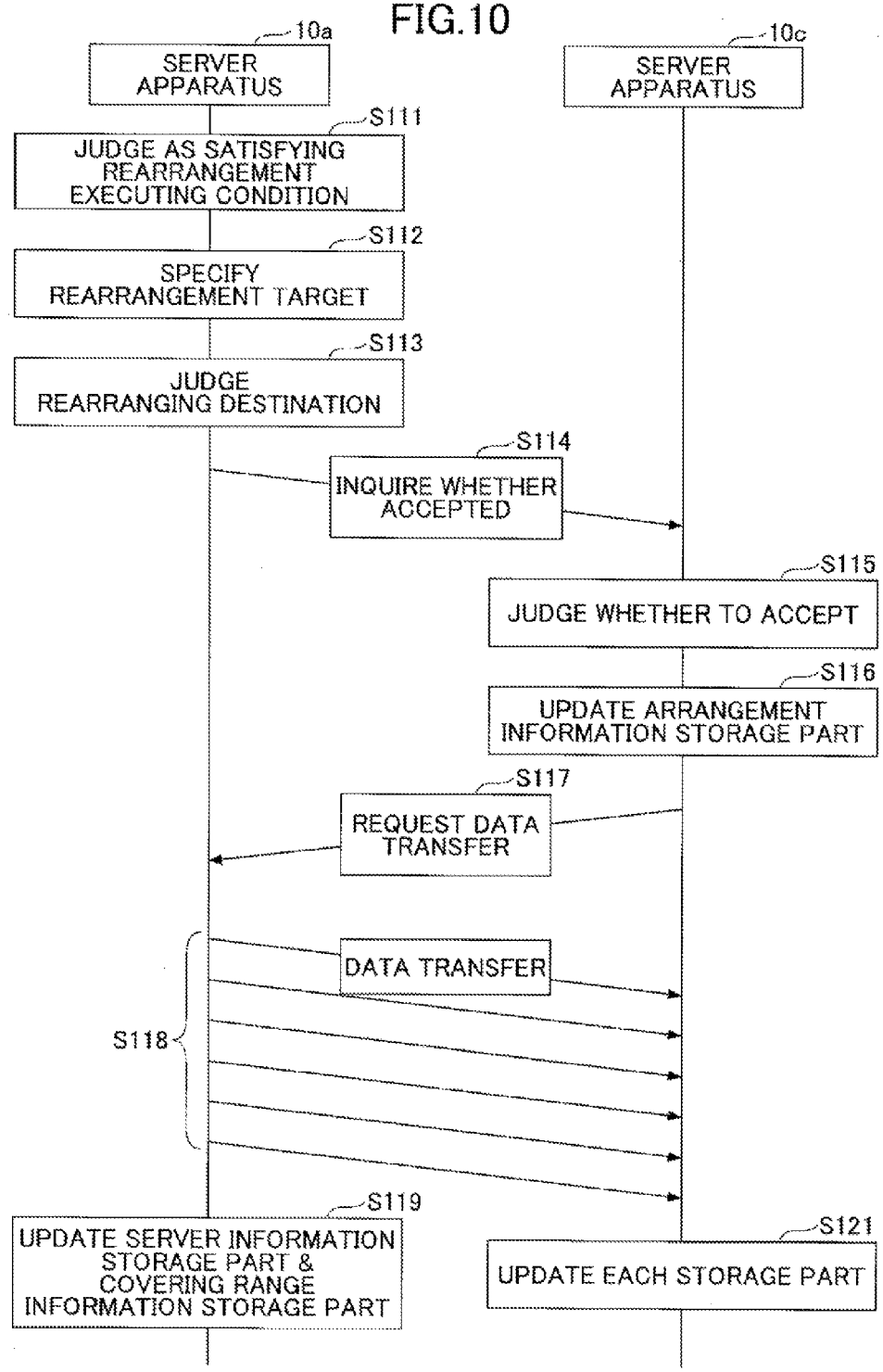
FIG. 10 is a sequence diagram for explaining an example of a processing procedure of a segmented range rearranging process.

Next, a description will be given of a segmented range rearranging process. FIG. 10 is a sequence diagram for explaining an example of a processing procedure of the segmented range rearranging process. FIG. 10 illustrates an example in which the segmented range covered by the server apparatus 10a (or server A) is rearranged to the server apparatus 10c (or server C).

The rearrangement executing part 16 of each server apparatus 10 may regularly (or periodically) refer to the server information storage part 13 illustrated in FIG. 8, for example, and judge whether the state of the data storage part 11 in the server apparatus 10 satisfies a condition for executing the rearrangement (hereinafter referred to as "rearrangement executing condition"). The rearrangement executing condition may be suitably determined depending on the application. For example, one example of the rearrangement executing condition is that the vacant capacity or the vacant capacity rate is the smallest among all of the server apparatuses 10. The vacant capacity rate may refer to a rate of the vacant capacity with respect to the total capacity. However, when the rearrangement executing condition is that the vacant capacity or the vacant capacity rate is the smallest, the rearrangement will always be performed, because the server apparatus 10 having the smallest vacant capacity or vacant capacity rate always exists among all of the server apparatuses 10. Hence, an additional condition may preferably be added to this rearrangement executing condition in order to suppress the frequent rearrangement. For example, the execution of the rearrangement may be prohibited until a predetermined time elapses from the time when the rearrangement is executed, in the entire data management system 1. In other words, the number of rearrangements may be limited to one within the predetermined time. Furthermore, the rearrangement executing condition may be that the vacant capacity or the vacant capacity rate of the server apparatus 10 is a predetermined value lower than that of one of the other server apparatuses 10 (or all of the other server apparatuses 10).

In FIG. 10, it is assumed for the sake of convenience that the rearrangement executing part 16a of the server apparatus 10a judges that the state of the data storage part 11a of the server apparatus 10a satisfies the rearrangement executing condition (step S111).

Next, the rearrangement target specifying part 161a may specify the segmented range that is the rearrangement target (step S112). For example, the segmented range having a relatively large number of data or total amount of data in the covering range information storage part 14a may be specified as the rearrangement target. More particularly, the segmented range having the largest number of data or total amount of data, or the segmented ranges having the top N largest number of data or total amount of data, may be specified as the rearrangement target. The value of N, of the top N largest number of data or total amount of data, may be determined depending on a difference between the vacant capacity or vacant capacity rate of the server apparatus 10a and the vacant capacity or vacant capacity rate of the other server apparatuses 10. In other words, the value of N may be determined so that, after execution of the rearrangement, the difference between the vacant capacity or vacant capacity rate of the server apparatus 10a and the vacant capacity or vacant capacity rate of the other server apparatuses 10 becomes less than a predetermined value. In FIG. 10, it is assumed for the sake of convenience that the segmented range in which the hash value is greater than or equal to 10 and less than 20 is specified as the rearrangement target.

Next, the rearranging destination specifying part 162a may refer to the server information storage part 13a, and specify the server apparatus 10 that is the rearranging destination (step S113). For example, the server apparatus 10 having the largest vacant capacity or vacant capacity rate in the server information storage part 13a may be specified as the rearranging destination. In FIG. 10, it is assumed for the sake of convenience that the server apparatus 10c is specified as the rearranging destination.

Of course, the rearrangement target and the rearranging destination may be specified by methods other than those described above.

Next, the transfer part 163a may send an inquiry to inquire whether to accept the segmented range of the rearrangement target, with respect to the server apparatus 10c at the rearranging destination (step S114). For example, the inquiry may specify information indicating the range of the hash value in the segmented range, the number of data in the segmented range, the total amount of data, and the like. The number of data and the total amount of data may be acquired from the covering range information storage part 14a.

The transfer part 163c of the server apparatus 10c may judge whether to accept the segmented range of the rearrangement target, in response to the received inquiry (step S115). For example, the transfer part 163c may judge whether a vacant capacity corresponding to the number of data and the total amount of data specified by the inquiry exists in the data storage part 11c. An error (or difference) may occur between the information related to the server apparatus 10c in the server information storage part 13a of the server apparatus 10a and the information related to the server apparatus 10c in the server information storage part 13c of the server apparatus 10c. In other words, depending on the information exchange timing of the information exchanging part 17 of each server apparatus 10, a mismatch may be generated temporarily between the server apparatuses 10. In addition, immediately before receiving the inquiry in the step S114, the server apparatus 10c may receive an inquiry similar to that of the step S114 from the server apparatus 10b and respond to this similar inquiry by accepting the segmented range of the rearrangement target. Hence, even when the server apparatus 10a recognizes prior to the step S114 that the vacant capacity of the server apparatus 10c is sufficient, it is not always the case that the transfer part 163c judges to accept the segmented range of the rearrangement target.

When the segmented range of the rearrangement target may be accepted, the transfer part 163c may update the record related to the segmented range of the rearrangement target in the arrangement information storage part 12c as illustrated in FIG. 11 (step S116).

FIG. 11 is a diagram illustrating an example of the arrangement information storage part during the rearrangement. When the arrangement information storage part 12c illustrated in FIG. 11 and the arrangement information storage part 12a illustrated in FIG. 7 are compared, it may be seen that for the segmented range in which the hash value HV is greater than or equal to 10 and less than 20, the version is updated from "10" to "11", and the server name is updated from "A" to "A→C". The designation "A→C" indicates that the rearrangement from the server apparatus 10a to the server apparatus 10c is in progress, that is, it is during the rearrangement (or during the transfer or updating process).

Next, the transfer part 163c may send a data transfer request with respect to the server apparatus 10a (step S117). The data transfer request may include the updated record of the arrangement information storage part 12c. When the server apparatus 10a receives the data transfer request, the transfer part 163a may overwrite the record in the arrangement information storage part 12a by the updated record included in the data transfer request. As a result, the stored contents of the arrangement information storage part 12a in the server apparatus 10a may also become as illustrated in FIG. 11. The record in the arrangement information storage part 12 of each of the server apparatuses 10 may be exchanged by the information exchanging parts 17. The information exchanging part 17 that receives the record of the arrangement information storage part 12 of another server apparatus 10 may compare the version of the received record and the version of the corresponding record in the arrangement information storage part 12 of the server apparatus 10 to which the information exchanging part 17 belongs. When the version of the received record is newer (that is, the value thereof is larger), the information exchanging part 17 may overwrite the record in the arrangement information storage part 12 of the server apparatus 10 to which the information exchanging part 17 belongs by the version of the received record.

Accordingly, the updated record in the arrangement information storage part 12c may be notified (or transferred) to the other server apparatuses 10 by the information exchanging part 17c. Consequently, it may be unnecessary to include the record in the data transfer request in the step S117. However, between the server apparatus 10a and the server apparatus 10c that perform the rearranging process, it may be preferable that the mismatch of the stored contents occur between the arrangement information storage parts 12c and 12a only for a relatively short time. Thus, it may be preferable to include, in the data transfer request in the step S117, the updated record in the arrangement information storage part 12c.

Next, the transfer part 163a may acquire all sets (or records) of the data keys and data belonging to the segmented range that is the rearrangement target from the data storage part 11a, and transfer the acquired sets of the data keys and data to the server apparatus 10c (step S118). In this state, the sets of the data keys and data may be deleted from the data storage part 11a when the transfer thereof is completed. When the transfer of all sets of the data keys and data is completed, the transfer part 163a may update the stored contents of the server information storage part 13a and the covering range information storage part 14a (step S119). In other words, the transfer part 163a may increase the vacant capacity of the server information storage part 13a with respect to the server apparatus 10a by an amount corresponding to the sets of the data keys and data that are transferred. In addition, the transfer part 163a may delete the record related to the segmented range of the rearrangement target from the covering range information storage part 14a. The updating of the stored contents of the server information storage part 13a and the covering range information storage part 14a may be performed successively according to the progress in the transfer of the sets of the data keys and data.

On the other hand, the transfer part 163c of the server apparatus 10c may store the sets of the data keys and data that are received in the data storage part 11c. When the reception of all sets of the data keys and data that are the transfer target is completed, the transfer part 163c may update the stored contents of the server information storage part 13c, the covering range information storage part 14c, and the arrangement information storage part 12c (step S121). In other words, the transfer part 163c may decrease the vacant capacity of the data storage part 11c with respect to the server apparatus 10c by an amount corresponding to the sets of the data keys and data that are received. In addition, the transfer part 163c may add the record related to the segmented range of the rearrangement target, with respect to the covering range information storage part 14c. The updating of the stored contents of the server information storage part 13c and the covering range information storage part 14c may be performed successively according to the progress in the transfer of the sets of the data keys and data.

Moreover, the transfer part 163c may update the record related to the segmented range of the rearrangement target in the arrangement information storage part 12c, as illustrated in FIG. 12.

FIG. 12 is a diagram illustrating an example of the arrangement information storage part after the rearrangement. When the arrangement information storage part 12c illustrated in FIG. 12 and the arrangement information storage part 12c illustrated in FIG. 11 are compared, it may be seen that for the segmented range in which the hash value HV is greater than or equal to 10 and less than 20, the version is updated from "11" to "12", and the server name is updated from "A→C" to "C".

The stored contents in the server information storage part 13a and the covering range information storage part 14a that are updated in the server apparatus 10a, and the stored contents in the server information storage part 13c, the covering range information storage part 14c, and the arrangement information storage part 12c that are updated in the server apparatus 10c, may be transferred and reflected to each of the server apparatuses 10 by the processes performed by the information exchanging parts 17 of the server apparatuses 10.

When the transfer part 163c judges in the step S115 that accepting of the segmented range of the rearrangement target is not possible, the transfer part 163c may return to the server apparatus 10a a response (or error response) indicating that the accepting of the segmented range of the rearrangement target is not possible. In this case, the rearrangement executing part 16a of the server apparatus 10a may repeat the process from the step S111. When repeating the process, the rearrangement target or the rearranging destination may be changed, for example. In addition, when the stored contents of the server information storage part 13a are updated by the information exchange made by the information exchanging part 17 of each of the server apparatuses 10 while the process is repeated, the rearrangement target, the rearranging destination, and the like may be judge again based on the stored contents after the updating.

Next, a description will be given of a processing procedure executed when the server apparatus 10a receives a Put request related to the data belonging to the segmented range of the rearrangement target, during execution of the rearrangement (during execution of the step S118 in FIG. 10).

Figure 13:
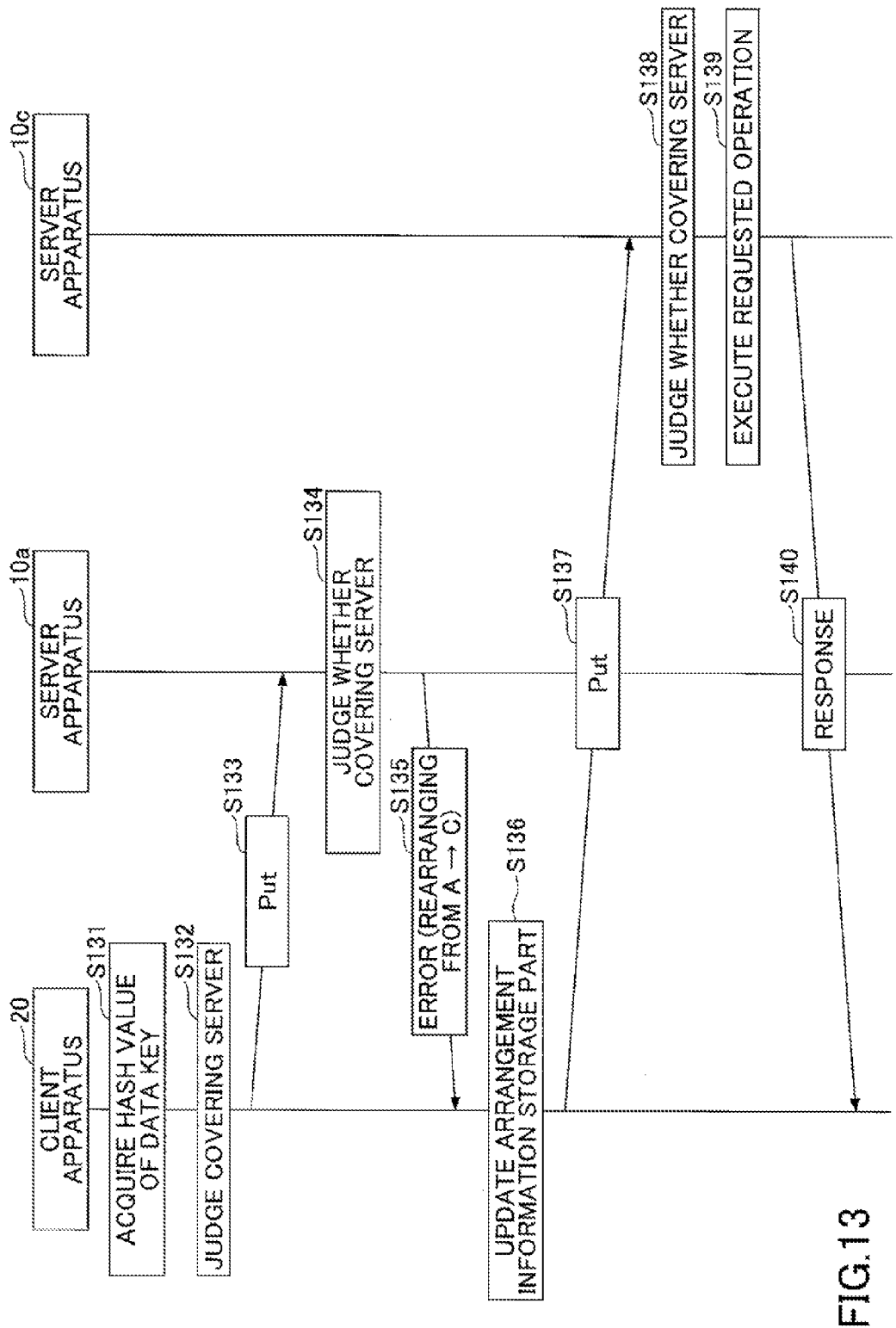
FIG. 13 is a sequence diagram for explaining an example of a processing procedure executed in response to a Put request during the rearrangement.

FIG. 13 is a sequence diagram for explaining an example of the processing procedure executed in response to the Put request during the rearrangement.

Processing contents of steps S131 and S132 in FIG. 13 may be the same as those of the steps S101 and S102 illustrated in FIG. 5. It is assumed for the sake of convenience that the data belonging to the segmented range in which the hash value is greater than or equal to 10 and less than 20 is the target of the Put request. Hence, the operation request part 21 of the client apparatus 20 may refer to the arrangement information storage part 22 illustrated in FIG. 6, and judge that the server apparatus 10a is the covering server.

Next, the operation request part 21 of the client apparatus 20 may send the Put request with respect to the server apparatus 10a (step S133). The operation part 15a of the server apparatus 10a that receives the Put request may refer to the arrangement information storage part 12a, and judge whether the server apparatus 10a is the covering server with respect to the segmented range to which the data that is the target of the Put request belongs (step S134). The stored contents in the arrangement information storage part 12a of the server apparatus 10a are updated as illustrated in FIG. 11 during execution of the step S118 of FIG. 10. Accordingly, the operation part 15a may judge that the server apparatus 10c is the covering server (that is, detect that the server apparatus 10c is the covering server). Thus, the operation part 15a does not execute the process according to the Put request, and may return to the client apparatus 20 a response indicating a Put failure (or error) and that the segmented range to which the data that is the target of the Put request belongs is being rearranged from the server apparatus 10a to the server apparatus 10c (step S135). In other words, the response from the operation part 15a may include the server name of the server apparatus 10a and the server name of the server apparatus 10c. However, the server name of the server apparatus 10a may be omitted in the response from the server apparatus 10a, because the client apparatus 20 may judge or recognize that the server apparatus 10a is the rearrangement source.

When the response from the server apparatus 10a is received, the operation request part 21 of the client apparatus 20 may update the server name of the segmented range to which the data that is the target of the Put request belongs to "A→C" in the arrangement information storage part 22 (Step S136). In other words, information indicating that the segmented range is being rearranged from the server apparatus 10a to the server apparatus 10c may be reflected to the arrangement information storage part 22.

Next, the operation request part 21 may send a Put request having the same contents as those sent in the step S133, with respect to the server apparatus 10c, based on the information indicating that the segmented range is being rearranged from the server apparatus 10a to the server apparatus 10c (step S137). Because the response indicating that the segmented range to which the data that is the target of the Put request belongs is being rearranged from the server apparatus 10a to the server apparatus 10c is returned from the server apparatus 10a together with the Put failure, the client apparatus 20 may specify the server apparatus 10 that is to be the sending destination of the Put request.

The operation part 15c of the server apparatus 10c that receives the Put request may refer to the arrangement information storage part 12c, and judge whether the server apparatus 10c is the covering server with respect to the segmented range to which the data that is the target of the Put request belongs. At this timing, the stored contents of the arrangement information storage part 12c are as illustrated in FIG. 11. Accordingly, the operation part 15c may judge that the server apparatus 10c is in the process of making a transition to the covering server.

Next, the operation part 15c may execute a process according to the Put request (step S139). In other words, the data keys and data specified by the Put request may be written to the data storage part 11c. Then, the operation part 15c may return to the client apparatus 20 a response including the information indicating whether the Put request is successfully executed (step S140).

When data related to the data key identical to that of the data written in the step S319 is thereafter transferred from the server apparatus 10a, the transfer part 163c may discard the data transferred from the server apparatus 10c, in order to avoid the process according to the Put request from becoming invalid.

Next, a description will be given of a processing procedure executed when the server apparatus 10a receives the Get request related to the data belonging to the segmented range of the rearrangement target, during execution of the rearrangement (that is, during execution of the step S118 of FIG. 10).

Figure 14:
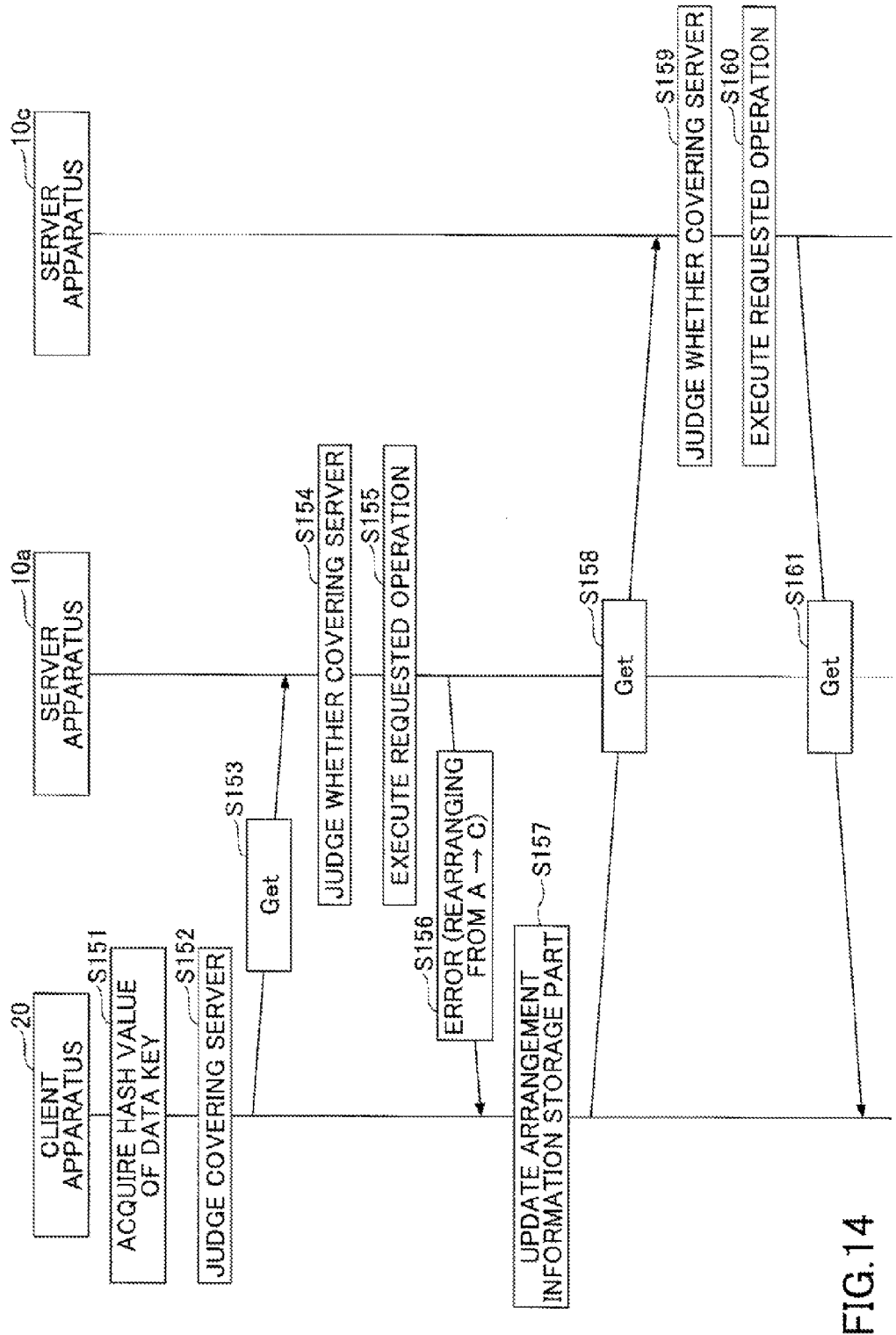
FIG. 14 is a sequence diagram for explaining an example of a first processing procedure executed in response to a Get request during the rearrangement.

FIG. 14 is a sequence diagram for explaining an example of a first processing procedure executed in response to the Get request during the rearrangement.

Processing contents of steps S151 through S153 in FIG. 14 may be the same as those of the steps S131 through S133 illustrated in FIG. 13, except that the step S153 sends the Get request.

The operation part 15a of the server apparatus 10a that receives the Get request may refer to the arrangement information storage part 12a, and judge whether the server apparatus 10a is the covering server for the segmented range to which the data that is the target of the Get request belongs (step S154). During execution of the step S118 in FIG. 10, the stored contents in the arrangement information storage part 12a of the server apparatus 10a may be updated as illustrated in FIG. 11. Accordingly, the operation part 15a may recognize that the segmented range to which the data that is the target of the Get request belongs is being rearranged from the server apparatus 10a to the server apparatus 10c (that is, detect that it is during the rearrangement from the server apparatus 10a to the server apparatus 10c). However, when the data that is the target of the Get request is not yet transferred, a response may be made with respect to the Get request. Hence, the operation part 15a may attempt to acquire from the data storage part 11a the data corresponding to the data key specified by the Get request (step S155). In this example, it is assumed for the sake of convenience that this acquisition of the data fails. In other words, it is assumed that the data is already transferred.

In response to the failure of the data acquisition, the operation part 15a may return to the client apparatus 20 a response indicating a Get failure (or error) and indicating that the segmented range to which the data that is the target of the Get request belongs is being rearranged from the server apparatus 10a to the server apparatus 10c (step S156). This response may include the server name of the server apparatus 10a and the server name of the server apparatus 10c. However, the server name of the server apparatus 10a may be omitted in the response.

The operation request part 21 of the client apparatus 20 receives the response from the server apparatus 10a, the operation request part 21 may update the server name of the segmented range to which the data that is the target of the Get request belongs to "A→C" in the arrangement information storage part 22 (step S157). Next, the operation request part 21 may send to the server apparatus 10c a Get request having the same contents as the Get request sent in the step S153, based on the response from the server apparatus 10a indicating the Get failure (or error) and indicating that the segmented range to which the data that is the target of the Get request belongs in step S153 is being rearranged from the server apparatus 10a to the server apparatus 10c (step S158). Because the response indicating the Get failure (or error) and indicating that the segmented range to which the data that is the target of the Get request belongs in step S153 is being rearranged from the server apparatus 10a to the server apparatus 10c is returned from the server apparatus 10a, the client apparatus 20 may specify the server apparatus 10 that is to become the sending destination of the Get request.

The operation part 15c of the server apparatus 10c that receives the Get request may execute processes similar to steps S154 and S155 (steps S159 and S160). Because the data that is the target of the Get request is already transferred to the server apparatus 10c, the data acquisition in the step 160 will be successful. Hence, the operation part 15c may return a response including the acquired data to the client apparatus 20 (step S161). As a result, the client apparatus 20 may acquire the desired data.

When the data acquisition is successful in the step S155, that is, when the data that is the target of the Get request is not yet transferred, the operation part 15a may return a response including the data to the client apparatus 20. In this state, the information indicating that the segmented range to which the data belong is being rearranged from the server apparatus 10a to the server apparatus 10c may be included in the response, or this information may be omitted from the response. This is because, the next time an operation request is received from the client apparatus 20 with respect to the data belonging to the segmented range and the operation fails because the data is already transferred, the server apparatus 10a may notify the client apparatus 20 that the segmented range is being rearranged in a manner similar to the step S156.

Next, a description will be given of a processing procedure executed when the server apparatus 10a again receives the Get request related to the data belonging to the segmented range of the rearrangement target, after the process of FIG. 14 is executed and at an arbitrary timing during the step S118 illustrated in FIG. 10. After the process of FIG. 14 is executed means that the client apparatus 20 recognizes that the segmented range in which the hash value is greater than or equal to 10 and less than 20 is being rearranged from the server apparatus 10a to the server apparatus 10c.

Figure 15:
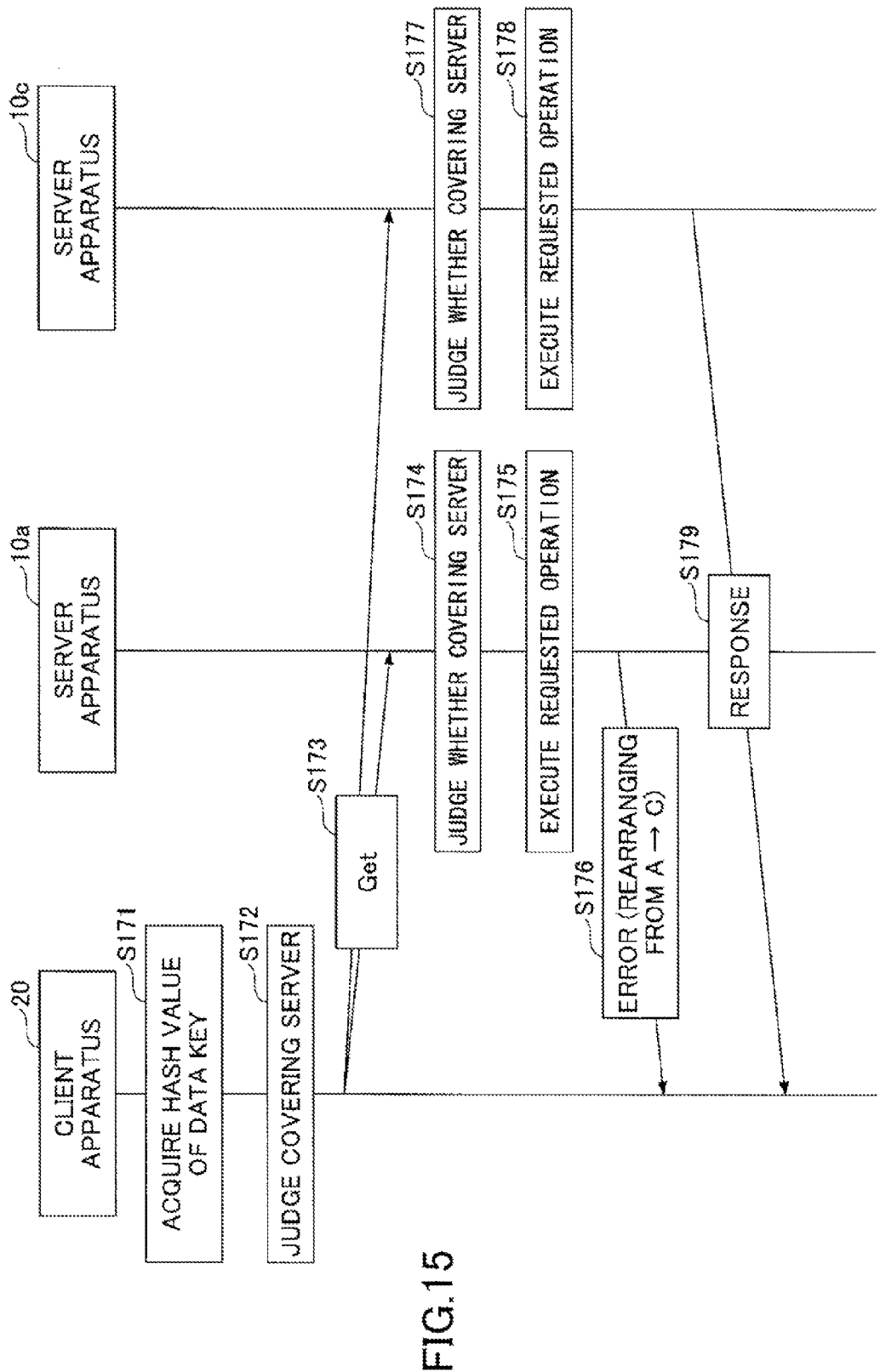
FIG. 15 is a sequence diagram for explaining an example of a second processing procedure executed in response to the Get request during the rearrangement.

FIG. 15 is a sequence diagram for explaining an example of a second processing procedure executed in response to the Get request during the rearrangement.

In steps S171 and S172 of FIG. 15, the operation request part 21 of the client apparatus 20 executes processes similar to those of the steps S151 and S152 illustrated in FIG. 14. However, at the timing when the step S172 is performed, the server name corresponding to the segmented range in which the hash value is greater than or equal to 10 and less than 20 is changed to "A→C" in the arrangement information storage part 22. Hence, it may be recognized that the data that is the target of the Get request exists either in the server apparatus 10a or the server apparatus 10c. Hence, the operation request part 21 simultaneously sends (that is, sends in parallel) Get requests having the same contents to both the server apparatus 10a and the server apparatus 10c (step S173). By simultaneously sending (that is, sending in parallel) the Get requests having the same contents with respect to the two server apparatuses 10, the time it takes to acquire the desired data may be shorted.

It this example, it is assumed for the sake of convenience that the data that is the target of the Get request is already transferred to the server apparatus 10c. Hence, in steps S174 through S176, the operation part 15a of the server apparatus 10a may execute processes similar to those of the steps S154 through S156 illustrated in FIG. 14. In addition, in steps S177 through S179, the operation part 15c of the server apparatus 10c may execute processes similar to those of the steps S159 through S161 illustrated in FIG. 14.

When the data that is the target of the Get request is not yet transferred, the operation part 15a of the server apparatus 10a may return a response including the data in a step S176. On the other hand, in a step S179, the operation part 15c of the server apparatus 10c may return to the client apparatus 20 a response indicating the Get failure (or error) and indicating that the segmented range to which the data that is the target of the Get request belongs is being rearranged from the server apparatus 10a to the server apparatus 10c. In other words, the response from the operation part 15c may include the server name of the server apparatus 10a and the server name of the server apparatus 10c.

Next, a description will be given of a processing procedure executed when the server apparatus 10a receives an operation request related to the data belonging to the segmented range of the rearrangement target, after execution of the rearranging process of FIG. 10 (that is, after the rearrangement is completed). In this example, it is assumed for the sake of convenience that the stored contents of the arrangement information storage part 22 in the client apparatus 20 are as illustrated in FIG. 6. That is, it is assumed that the rearrangement related to the segmented range is not reflected to the arrangement information storage part 22.

In this case, a processing procedure similar to that of FIG. 13 is performed for the Put request and for the Get request. However, the stored contents of the arrangement information storage part 12 in each of the server apparatus 10a and the server apparatus 10c are as illustrated in FIG. 12. Hence, in the step S135, the operation part 15a may return to the client apparatus 20 a response indicating the operation (Put or Get) failure (or error), and indicating that the segmented range to which the data that is the target of the operation belongs is being rearranged to the server apparatus 10c. In other words, the response from the operation part 15a may include the server name of the server apparatus 10c.

Accordingly, in the step S136, the operation request part 21 of the client apparatus 20 may update the server name with respect to the segmented range to which the data that is the target of the operation belongs to "C", in the arrangement information storage part 22. When an operation is thereafter required with respect to the data belonging to this segmented range, the client apparatus 20 may send an operation request with respect to the server apparatus 10c that is the rearranging destination.

As described above, according to the first embodiment, the hash space may be segmented into a number of segmented ranges larger than the number of server apparatuses 10, and each segmented range may be rearranged among the server apparatuses 10 when preferred. Thus, the flexibility of the arrangement of the data with respect to each of the server apparatuses 10 may be improved. As a result, the possibility of a biased state in which the data arrangement is concentrated to some of the server apparatuses 10 and the load is concentrated on some of the server apparatuses 10 continuing may be reduced.

Next, a description will be given of a second embodiment. A description will be given of operation of the second embodiment that differs from that of the first embodiment. Hence, in the following description, the operation of the second embodiment is the same as that of the first embodiment, unless otherwise indicated.

Figure 16:
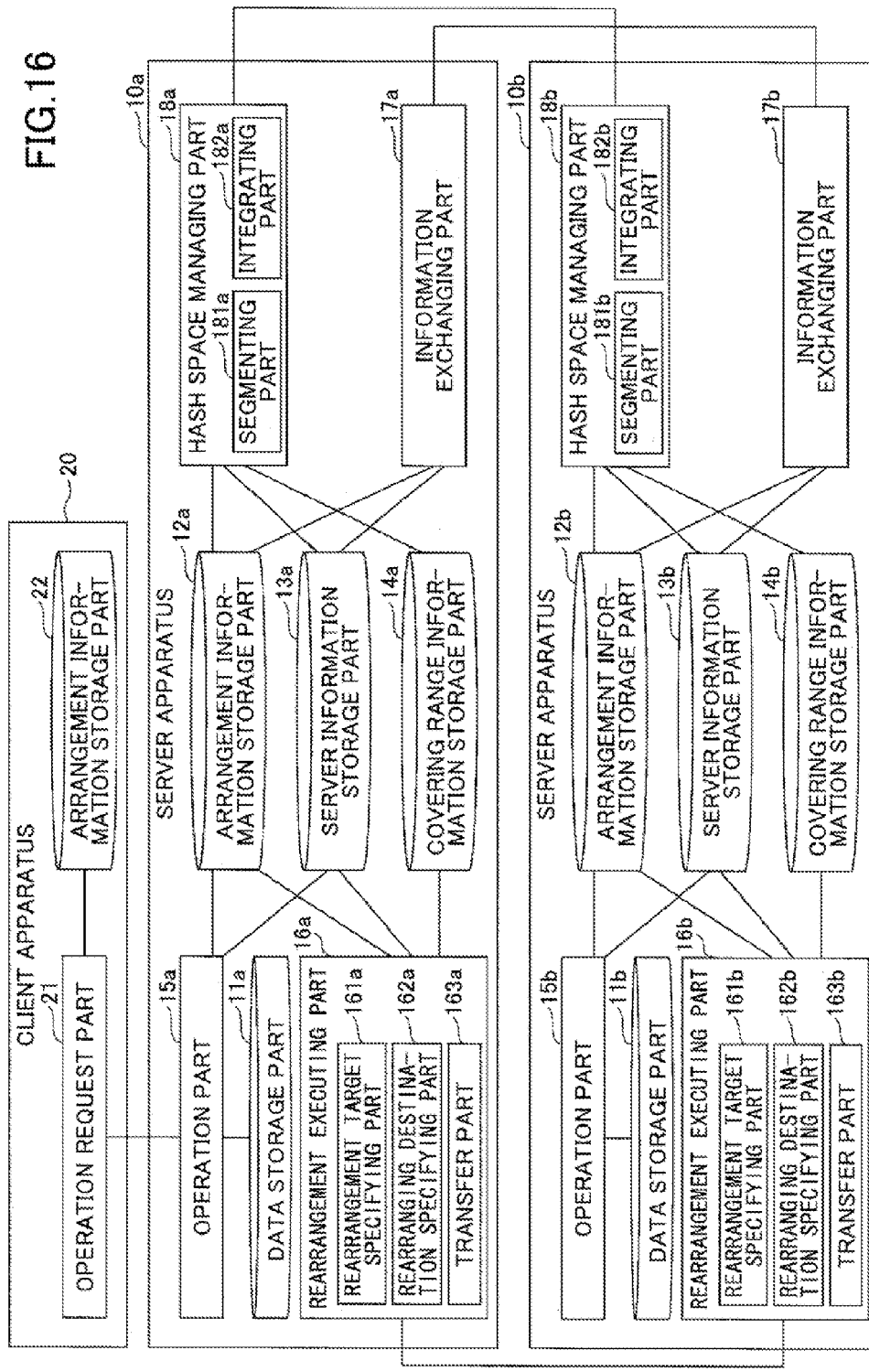
FIG. 16 is a diagram illustrating an example of the functional structure of the data management system in a second embodiment.

FIG. 16 is a diagram illustrating an example of the functional structure of the data management system in the second embodiment. Depending on the number of server apparatuses 10 that is increased or decreased, a change in the data arrangement distribution with respect to each of the segmented ranges, and the like, the unbalance among the server apparatuses 10 may be difficult to cure by the rearrangement of the segmented ranges. Hence, in this second embodiment, each server apparatus 10 is provided with a hash space managing part 18.

When the arrangement of the data is biased to some of the segmented ranges, for example, the hash space managing part 18 may execute a process to suppress or cure the unbalance in the data arrangement state among the segmented ranges. More particularly, the hash space managing part 18 may include a segmenting part 181 and an integrating part 182. The segmenting part 181 segments a segmented range having a relatively large amount of data into a plurality of segmented ranges. The integrating part 182 integrates segmented ranges having relatively small amounts of data into one segmented range.

Figure 17:
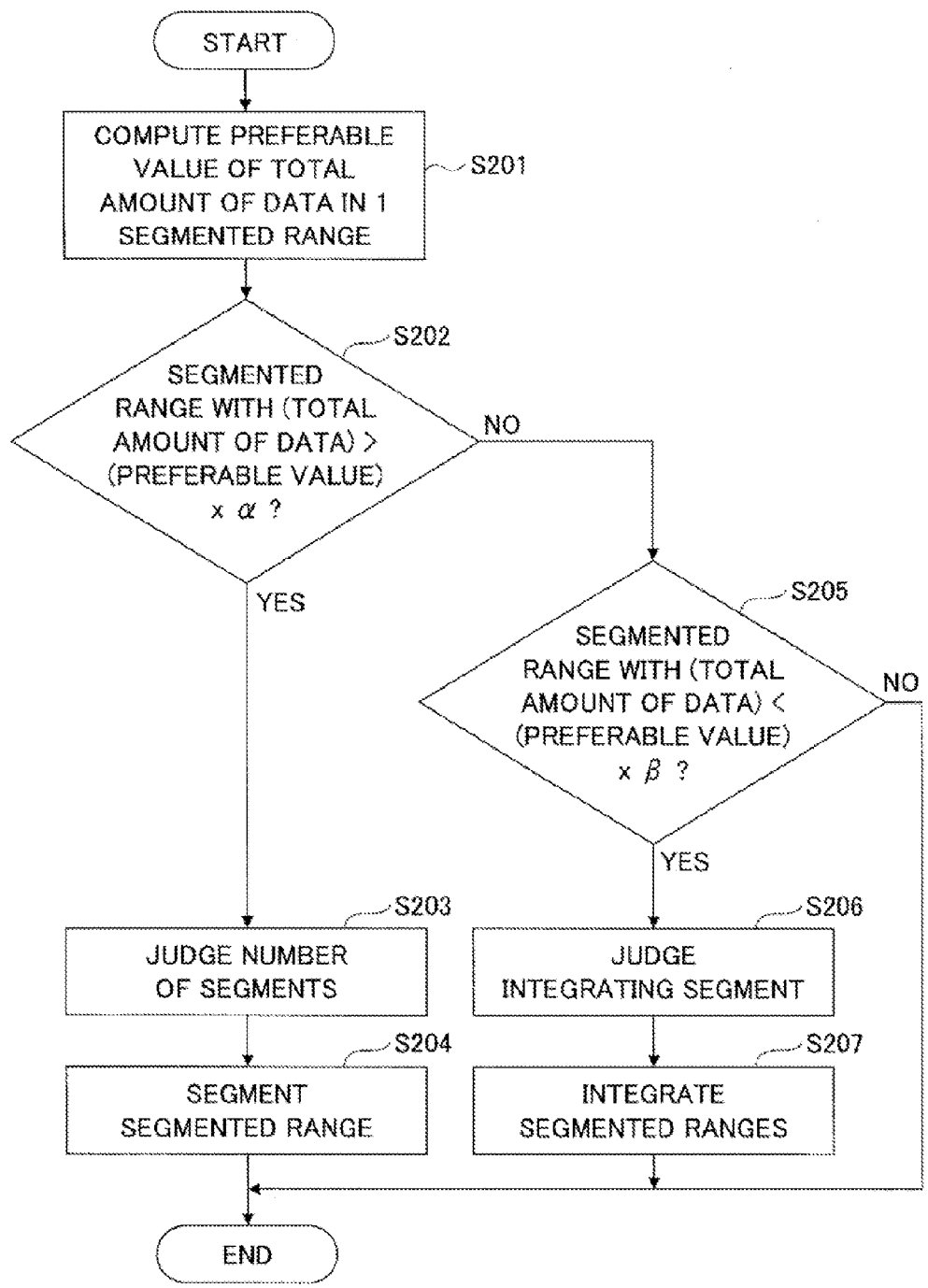
FIG. 17 is a flow chart for explaining an example of a processing procedure to segment and integrate the segmented ranges.

A description will be given of a processing procedure executed by the hash space managing part 18. FIG. 17 is a flow chart for explaining an example of the processing procedure to segment and integrate the segmented ranges. For example, the hash space managing part 18 may regularly execute the process of FIG. 17.

In a step S201, the hash space managing part 18 may compute a preferred value (or optimum value) for the total amount of data with respect to one segmented range. The preferred value may be computed based on the following formula (1), for example, where PV denotes the preferred value, TAD denotes the total amount of data in the data management system 1, and N denotes the number of segmented ranges.

$$PV = TAD/N \qquad (1)$$

The total amount of data, TAD, in the data management system 1 may be obtained by subtracting a total amount of vacant capacity of the server information storage part 13 from a total amount of capacity of the server information storage part 13. In addition, the number of segmented ranges, N, may be obtained by referring to the arrangement information storage part 12.

For example, based on the server information storage part 13a of FIG. 8, the total amount of capacity may be 100+100+120=320 [TB]. In addition, the total amount of vacant capacity may be 20+30+40=90 [TB]. Hence, the total amount of data, TAD, in the data management system 1 may be 320–90=230 [TB]. In addition, based on the arrangement information storage part 12a of FIG. 7, the number of segmented ranges, N, may be 10. Thus, the preferred value PV may be 230/10=23 [TB].

Next, the hash space managing part 18 may judge whether a segmented range for which the total amount of data stored in the covering range information storage part 14 is greater than $\alpha$ times the preferred value PV (step S202), where $\alpha$ is a coefficient greater than 1 and prescribes what multiple value of the preferred value PV may be excessively large with respect to one segmented range. The value of $\alpha$ may be determined depending on the operation. For example, when $\alpha$=2.0, the existence of the segmented range for which the total amount of data stored in the covering range information storage part 14 may be greater than 23×2.0=46 [TB]=47104 [GB].

In the case of the covering range information storage part 14a illustrated in FIG. 9, for example, the segmented range in which the hash value is greater than or equal to 10 and less than 20 may satisfy the condition judged in the step S202 (YES in step S202). Hence, the hash space managing part 18 may regard this segmented range as the target of further segmenting. Of course, the segmenting target may be selected according to other methods. For example, instead of using the coefficient a, the segmented range having the total amount of data greater than a value obtained by adding an absolute value to the preferred value PV may be regarded as the segmenting target. Further, the preferred value PV may also be computed according to other methods. For example, instead of using the amount of data, the preferred value PV may be computed based on the number of data. In either case, it may be preferable that the segmenting target is a segmented range in which the total amount of data or the number of data is relatively large.

Next, the hash space managing part 18 may judge the segmenting number, that is, the number of segments to which the segmented range is to be further segmented (step S203). For example, the segmenting number may be judged as being a minimum segmenting number that makes the total amount of data of each of the segmented ranges after the further segmenting less than or equal to the preferred value PV. Alternatively, the segmenting number may be set to a fixed value, such as "5", for example. Even when a segmented range having the total amount of data that is extremely small is formed by the further segmenting, the unbalance may be suppressed or cured by an integrating process that integrates the segmented ranges in a step S205 and subsequent steps which will be described later.

In this example, it is assumed for the sake of convenience that the segmenting number is judged to be "2".

Next, the hash space managing part 18 may segment the segmented range that is the segmenting target into a number of segmented ranges indicated by the segmenting number (step S204). The further segmenting of the segmented range means that the covering range information storage part 14 and the arrangement information storage part 12 are updated.

Accordingly, the covering range information storage part 14a illustrated in FIG. 9 may be updated as illustrated in FIG. 18. FIG. 18 is a diagram illustrating an example of the covering range information storage part after the segmenting of the segmented range.

FIG. 18 illustrates an example in which the segmented range in which the hash value HV is greater than or equal to 10 and less than 20, is segmented into a segmented range in which the hash value HV is greater than or equal to 10 and less than 15, and a segmented range in which the hash value HV is greater than or equal to 15 and less than 20. Based on the data key of each data belonging to the segmented range, before the further segmenting, in which the hash value HV is greater than or equal to 10 and less than 20, the hash space managing part 18 may judge one of the segmented range in which the hash value HV is greater than or equal to 10 and less than 15 and the segmented range in which the hash value HV is greater than or equal to 15 and less than 20, to which each data belongs. Based on a result of this judging, the hash space managing part 18 may store the number of data and the total amount of data for each of the segmented range in which the hash value HV is greater than or equal to 10 and less than 15 and the segmented range in which the hash value HV is greater than or equal to 15 and less than 20, in the covering range information storage part 14a.

In addition, the arrangement information storage part 12a illustrated in FIG. 7 after the segmenting may be updated as illustrated in FIG. 19. FIG. 19 is a diagram illustrating an example of the arrangement information storage part after the segmenting of the segmented range.

FIG. 19 illustrates an example in which the segmented range in which the hash value HV is greater than or equal to 10 and less than 20, is segmented into a segmented range in which the hash value HV is greater than or equal to 10 and less than 15, and a segmented range in which the hash value HV is greater than or equal to 15 and less than 20. The hash space managing part 18 may increment by "1" the value of the version of each of the two segmented ranges obtained after the segmenting. The server name of the two segmented ranges after the segmenting may be the same as the server name of the segmented range before this segmented range is segmented into the two segmented ranges.

When a plurality of segmented ranges satisfy the condition of the step S202, the steps S203 and S204 may be executed with respect to the plurality of segmented ranges satisfying the condition.

On the other hand, when the segmented range satisfying the condition of the step S202 does not exist (No in step S202), the hash space managing part 18 may judge whether a segmented range for which the total amount of data stored in the covering range information storage part 14 is less than $\beta$ times the preferred value PV (step S205), where $\beta$ is a coefficient greater than 0 and less than 1 and prescribes what fraction of the preferred value PV may be excessively small with respect to one segmented range. The value of $\beta$ may be determined depending on the operation. For example, $\beta$ may be an inverse number $\alpha$.

For example, when $\beta=0.2$, the existence of the segmented range for which the total amount of data stored in the covering range information storage part 14 may be smaller than 23×0.2=4.6 [TB]=4710.4 [GB].

In the case of the covering range information storage part 14a illustrated in FIG. 9, for example, the segmented range in which the hash value is greater than or equal to 20 and less than 30, and the segmented range in which the hash value is greater than or equal to 90 and less than 90 may satisfy the condition judged in the step S205 (YES in step S205). Hence, the hash space managing part 18 may regard these segmented ranges as the target of integrating (or combining). Of course, the integrating target may be selected according to other methods, similarly as in the case of selecting the segmenting target.

Next, the hash space managing part 18 may judge an integrating segmented range, that is, the segmented range to be integrated with the integrating target (step S206). For example, when a plurality of segmented ranges are regarded as the integrating target, one of the integrating targets may be regarded as the integrating segmented range to be integrated with another integrating target. In addition, when a single integrating target exists, an integrating segmented range to be integrated with the single integrating target may be selected such that the total amount of data in the segmented range of the single integrating target and the integrating segmented range is less than $\alpha$ times the preferred value PV (PV×$\alpha$). In addition, when a single integrating target exists, one of the segmented ranges other than the single integrating target and having the total amount of data that is a minimum amongst the segmented ranges may be selected as the integrating segmented range. Of course, three or more segmented ranges may be integrated into a single segmented range.

Next, the hash space managing part 18 may integrate the segmented range of the integrating target and the integrating segmented range into a single segmented range (step S207). More particularly, the integration of the segmented ranges into the single segmented range means that the covering range information storage part 14 and the arrangement information storage part 12 are updated.

In other words, in the covering range information storage part 14, the record related to the segmented range of the integrating target and the record related to the integrating segmented range are integrated into a single record. In this state, the values of the number of data and the total amount of data in the single record that is obtained by the integration of the segmented ranges may be sums of the corresponding values of the records of the segmented ranges that are integrated.

In the arrangement information storage part 12, the record related to the segmented range of the integrating target and the record related to the integrating segmented range are integrated into a single record. In this state, the version of the single record that is obtained by the integration of the segmented ranges may be a value obtained by incrementing by "1" a maximum value of the versions of the records of the segmented ranges that are integrated.

The stored contents of the covering range information storage part 14 and the arrangement information storage part 12, that are results of segmenting the segmented range and results of integrating the segmented ranges, may be reflected to the covering range information storage part 14 and the arrangement information storage part 12 of other server apparatuses 10 by the information exchanging part 17. Accordingly, the rearrangement of the segmented ranges after the segmenting of the segmented range or after the integration of the segmented ranges may be executed in units of the segmented ranges after the segmenting or after the integration.

The segmented range after the segmenting or after the integration may be notified to the client apparatus 20 by a response to receiving the operation request by the server apparatus 10 that does not have the data that is the operation target, in the step S135 of FIG. 13, in the step S156 of FIG. 14, or in the step S176 of FIG. 15, for example. In this state, the range of the hash value of the segmented range to which the data key specified by the operation request belongs, may included in the response together with the server name of the server apparatus 10 having the data that is the operation target. The operation request part 21 of the client apparatus 20 may update the stored contents of the arrangement information storage part 22, based on the server name and the range of the hash value in the segmented range included in the response. Accordingly, the results of segmenting the segmented range or the results of integrating the segmented ranges may be reflected to the client apparatus 20 for each segmented range that is the operation target.

As described above, according to the second embodiment, the bias among the segmented ranges may be suppressed or cured by the segmenting of the segmented range or the integration of the segmented ranges, even when the bias occurs in the distribution of the data arrangement among the segmented ranges.

Next, a description will be given of a third embodiment. A description will be given of operation of the third embodiment that differs from that of the first or second embodiment. Hence, in the following description, the operation of the third embodiment is the same as that of the first or embodiment, unless otherwise indicated.

In the third embodiment, it is assumed for the sake of convenience that the data storage part 11 may be formed by a plurality of auxiliary storage units 102 having different access performances. For example, the data storage part 11 may include a SSD (Solid State Drive) having a relatively high access speed in a hierarchical layer (or level) 1, and a HDD (Hard Disk Drive) having a relatively low access speed in a hierarchical layer (or level) 2. Of course, the data storage part 11 of not all of the server apparatuses 10 may have the hierarchical structure with two (2) hierarchical layers.

Figure 20:
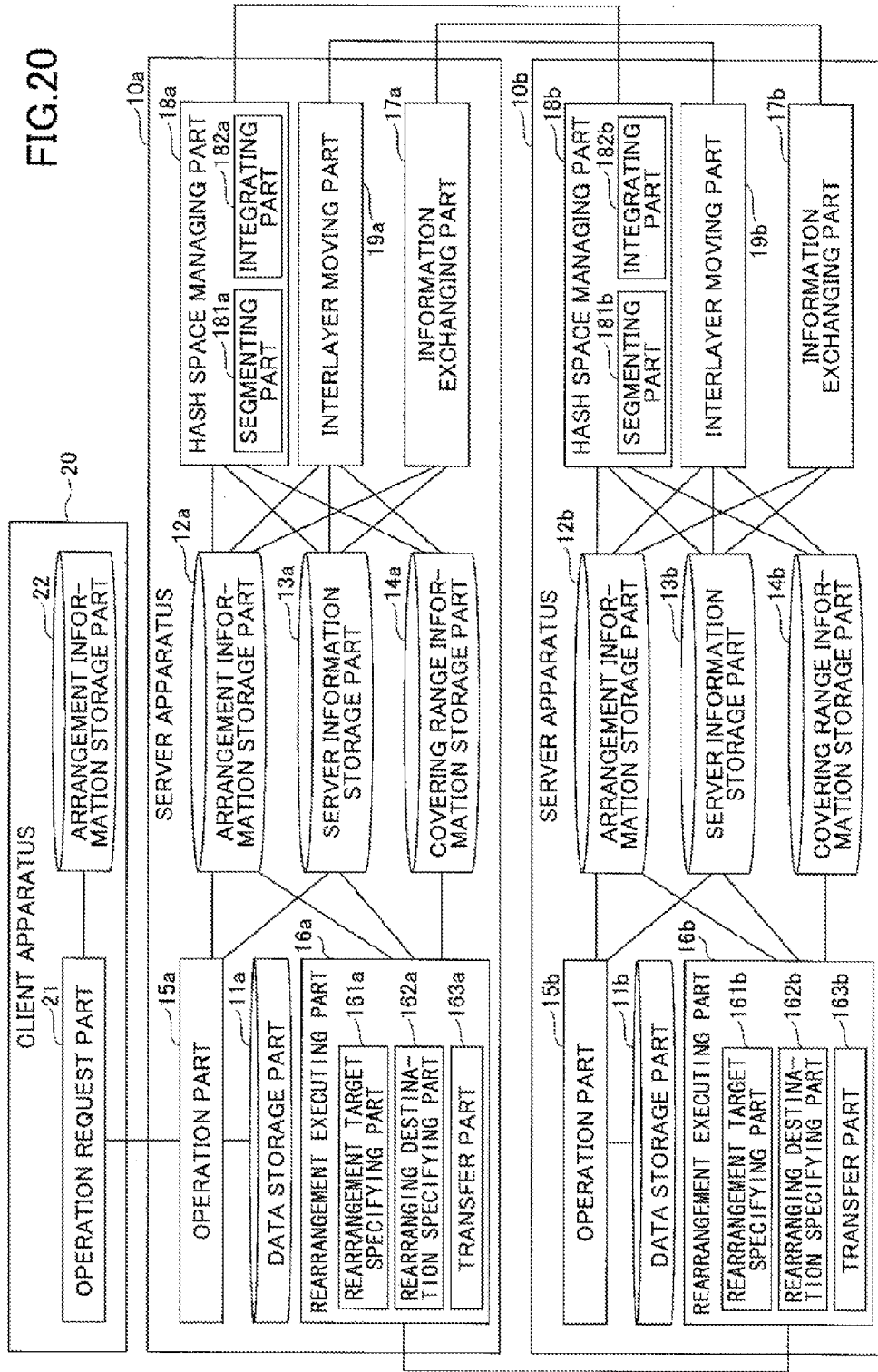
FIG. 20 is a diagram illustrating an example of the functional structure of the data management system in a third embodiment.

FIG. 20 is a diagram illustrating an example of the functional structure of the data management system in the third embodiment. In FIG. 20, each server apparatus 10 may include an interlayer moving part 19. The interlayer moving part 19 may move the hierarchical layer that is the storage destination of data, depending on the operation frequency (or number of times the operation is performed) on the data stored in the data storage part 11. The operation frequency on the data may indicate how frequency the operation is performed on the data. For example, the interlayer moving part 19 may move the data having a relatively high operation frequency from the hierarchical layer 2 to the hierarchical layer 1, and move the data having a relatively low operation frequency from the hierarchical layer 1 to the hierarchical layer 2. The move may be made between the hierarchical layers in units of data. The move between the hierarchical layers is not made in units of segmented range, because the operation frequency may greatly differ between the data belonging to the same segmented range. The operation frequency may be stored in the data storage part 11, in relation to (that is, in a related manner to) the sets of data keys and data. When the Get or Put request is executed with respect to the data, the operation frequency of the data may be incremented by "1".

The data storage part 11 may have the hierarchical structure with the plurality of hierarchical layers (or levels) as described above. For this reason, the arrangement information storage part 12, the server information storage part 13, and the covering range information storage part 14 of each server apparatus 10 may be expanded in the following manner, for example.

FIG. 21 is a diagram illustrating an example of the structure of the arrangement information storage part in the third embodiment. As illustrated in FIG. 21, the arrangement information storage part 12 in this third embodiment stores the version and the covering server, separately for each hierarchical layer, for each of the segmented ranges. In this third embodiment, even in the case of the data belonging to the same segmented range, the data may include data belonging to the hierarchical layer 1 and data belonging to the hierarchical layer 2. In addition, it may be unnecessary for the two hierarchical layers with respect to the same segmented range to be provided in the data storage part 11 of the same server apparatus 10. As described above, because it may be unnecessary for all of the server apparatuses 10 to be provided with the two hierarchical layers, it may be preferable to tolerate a state in which the covering server for the hierarchical layer 1 and the covering server for the hierarchical layer 2 are different, in order to allocate the two hierarchical layers to each segmented range.

In the third embodiment, the server apparatus 10a and the server apparatus 10b may respectively include both the SDD (hierarchical layer 1) and the HDD (hierarchical layer 2). The server apparatus 10c may only include the HDD (hierarchical layer 2), and the server apparatus 10d may only include the SDD (hierarchical layer 1). The allocation of the covering server with respect to each hierarchical layer of each segmented range may be determined based on any arbitrary method. In this third embodiment, it is assumed for the sake of convenience that the data management system 1 includes four server apparatuses 10, namely, the server apparatuses 10a, 10b, 10c, and 10d.

According to FIG. 21, when the operation frequency becomes less than a predetermined value A with respect to the data belonging to the segmented range in which the hash value HV is greater than or equal to 0 and less than 10 and stored in the hierarchical layer 1 of the server apparatus 10d, the interlayer moving part 19 may move the data to the hierarchical layer 2 of the server apparatus 10c. In addition, when the operation frequency exceeds a predetermined value B with respect to the data stored in the hierarchical layer 2 of the server apparatus 10c, the interlayer moving part 19 moves the data to the hierarchical layer 1 of the server apparatus 10d. The data may be moved in a similar manner for the other segmented ranges.

FIG. 22 is a diagram illustrating an example of the structure of the server information storage part in the third embodiment. As illustrated in FIG. 22, the server information storage part 13 in this third embodiment stores the version, the total capacity, and the vacant capacity separately for each hierarchical layer, for each of the server apparatuses 10. The value in the item related to the hierarchical layer is blank with respect to the server apparatus 10 that does not have the corresponding hierarchical layer.

FIG. 23 is a diagram illustrating an example of the structure of the covering range information storage part in the third embodiment. FIG. 23 illustrates an example of the stored contents of the covering range information storage part 14a in the server apparatus 10a. The covering range information storage part 14 of other server apparatuses 10 may have a structure similar to that of the covering range information storage part 14a illustrated in FIG. 23.

As illustrated in FIG. 23, the covering range information storage part 14a in this third embodiment may store the number of data and the total amount of data, separately for each hierarchical layer, with respect to each segmented range included in the covering range of the server apparatus 10a. With respect to the segmented range that is the covering range of the server apparatus 10a only for one of the two hierarchical layers, the number of data and the total amount of data are stored only with respect to the one of the two hierarchical layers.

The client apparatus 20 may store only the information related to the hierarchical layer 1 in the arrangement information storage part 22. Hence, the structure of the arrangement information storage part 22 may be similar to that illustrated in FIG. 6.

Next, a description will be given of a processing procedure executed by the data management system in the third embodiment.

Figure 24:
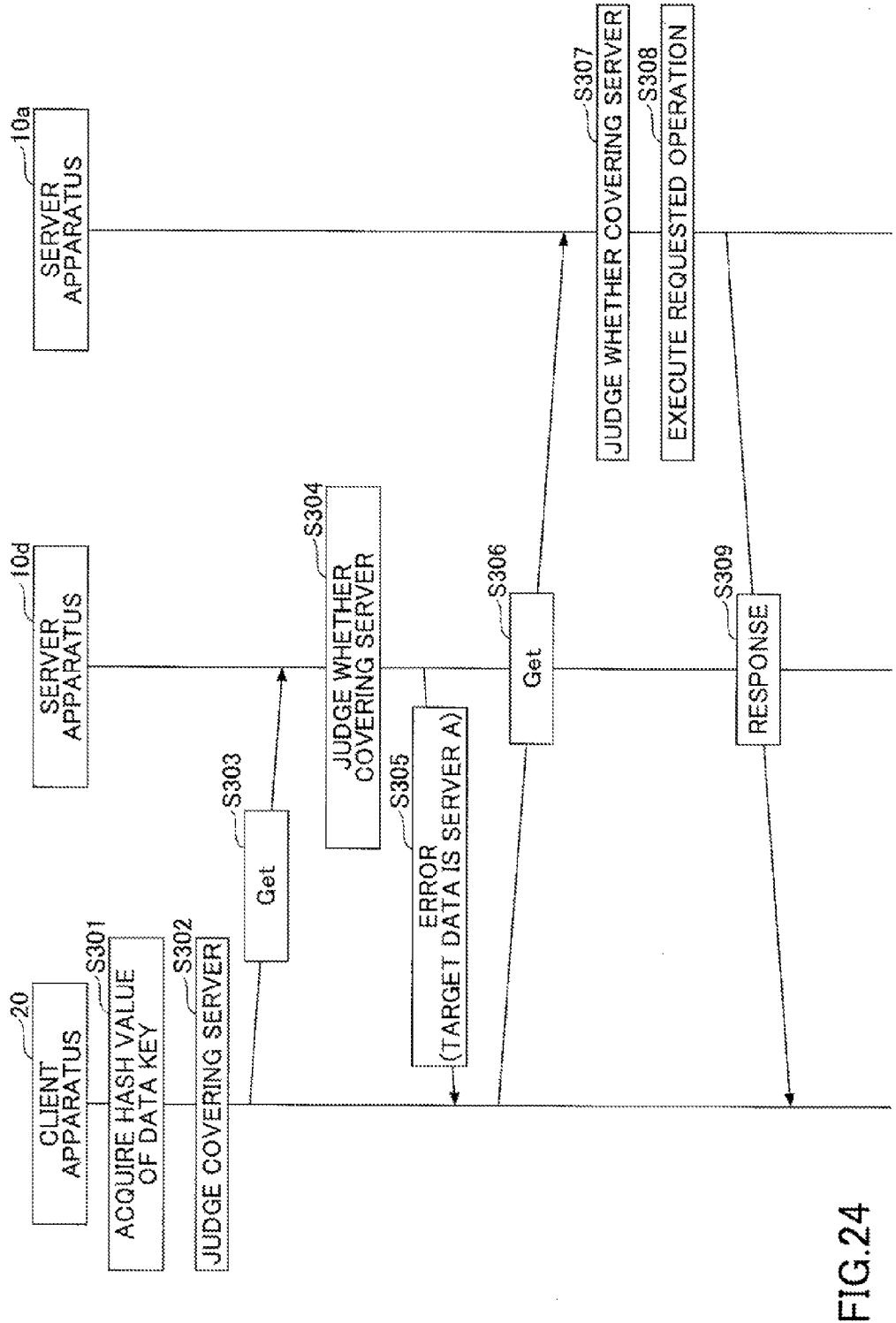
FIG. 24 is a sequence diagram for explaining an example of a processing procedure executed in response to the Get request in the third embodiment.

FIG. 24 is a sequence diagram for explaining an example of the processing procedure executed in response to the Get request in the third embodiment.

Steps S301 through S303 in FIG. 24 may be similar to the steps S101 through S103 illustrated in FIG. 5. However, the operation request in the step S303 may be the Get request. In addition, it is assumed that the hash value of the data key of the data that is the target of the Get request is greater than or equal to 10 and less than 20. Accordingly, when the stored contents of the arrangement information storage part 22 in the client apparatus 20 are the same as the part of the hierarchical layer 1 in FIG. 21 (but not including the version), the Get request may be sent to the server apparatus 10d having the server name "D".

The operation part 15d of the server apparatus 10d that receives the Get request may judge whether the server apparatus 10d is the covering server with respect to the data that is the target of the Get request (step S304). More particularly, the operation part 15d may first refer to the arrangement information storage part 12d, and confirm whether the server apparatus 10d is the covering server for at least one of the hierarchical layers 1 and 2 of the segmented range to which the hash value of the data key specified by the Get request belongs. When the server apparatus 10d is the covering server for at least one the hierarchical layers 1 and 2, the operation part 15*d* may attempt to acquire the data corresponding to the data key specified by the Get request from the one of the hierarchical layers 1 and 2. According to the example illustrated in FIG. 21, the server apparatus 10*d* is the covering server for the hierarchical layer 1 of the segmented range in which the hash value HV is greater than or equal to 10 and less than 20. Hence, the operation part 15*d* may attempt to acquire the data from the hierarchical layer 1. In a case in which the server apparatus 10*d* is the covering server for both of the hierarchical layers 1 and 2, the operation part 15*d* may attempt to acquire the data from both of the hierarchical layers 1 and 2.

When the data acquisition from the hierarchical layer 1 fails, the operation part 15*d* may refer to the arrangement information storage part 12*d* (FIG. 21), and recognize that the server apparatus 10*a* is the covering server for the hierarchical layer 2 of the segmented range in which the hash value HV is greater than or equal to 10 and less than 20. For example, when the data is moved to the hierarchical layer 2 by the interlayer moving part 19*d*, the data acquisition from the hierarchical layer 1 may fail.

Next, the operation part 15*d* may send to the client apparatus 20 a response indicating the Get failure (or error), and indicating that the server apparatus 10*a* has the data that is the target of the Get request (step S305). In other words, the response sent to the client apparatus 20 may include the server name of the server apparatus 10*a*. When the client apparatus 20 receives the response, the operation request part 21 may send to the server apparatus 10*a* a Get request having the same contents as the Get request sent in the step S303 (step S306).

When the server apparatus 10*a* receives the Get request, the operation part 15*a* may judge whether the server apparatus 10*a* is the covering server for the data that is the target of the Get request (step S307). The judging procedure of the step S307 may be the same as that of the step S304, and a description thereof will be omitted. The operation part 15*a* may acquire the data that is the target of the Get request from the hierarchical layer 2, based on a judgement result of the step S307 (step S308). Next, the operation part 15*a* may return a response including the acquired data to the client apparatus 20 (step S309). As a result, the client apparatus 20 may acquire the desired data.

Figure 25:
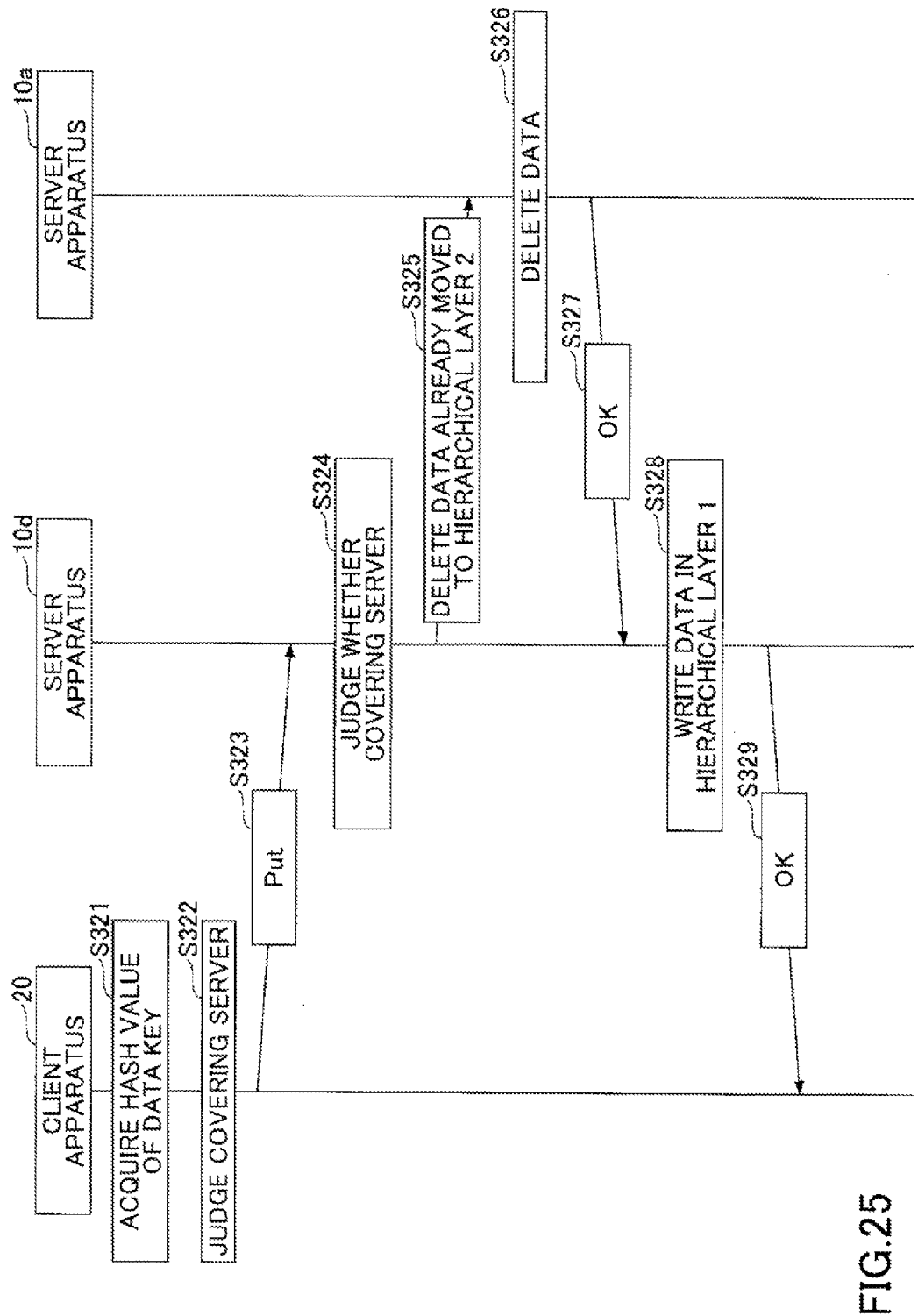
FIG. 25 is a sequence diagram for explaining an example of the processing procedure executed in response to the Put request in the third embodiment.

FIG. 25 is a sequence diagram for explaining an example of the processing procedure executed in response to the Put request in the third embodiment.

Steps S321 through S324 in FIG. 25 may be substantially similar to the steps S301 through S304 illustrated in FIG. 24. However, the operation request in the step S323 may be the Put request. In addition, it is assumed that the hash value of the data key specified by the Put request is greater than or equal to 10 and less than 20, that is, the same as the values specified for the Get request in FIG. 24. Accordingly, the Put request may be sent to the server apparatus 10*d*.

When the data with respect to the data key specified by the Put request does not exist in the hierarchical layer 1, the operation part 15*d* may send a delete request specifying the data key, based on the arrangement information storage part 12*d* (FIG. 21), to the server apparatus 10*a* that is the covering server for the hierarchical layer 2 (step S325). The operation part 15*a* of the server apparatus 10*a* may delete the set of data key and the data corresponding to the data key, from the data storage part 11*a*, according to the delete request (step S326). The operation part 15*a* may return to the server apparatus 10*d* a response (OK) indicating the successful deletion of the data (step S327).

In response to receiving the response indicating the successful deletion of the data, the operation part 15*d* of the server apparatus 10*d* may execute a process according to the Put request received in the step S323 (step S328). In other words, the operation part 15*d* mat store the set of the data key specified by the Put request and the data in the hierarchical layer 1. Because there is a relatively high possibility that the data related to the Put request may continue to be the operation target, the data related to the Put request may be stored in the hierarchical layer 1 in order to increase the access speed. In addition, the sending of the delete request with respect to the server apparatus 10*a* may be a measure to avoid overlapping management of the same data.

When the writing of the set of data key and data to the hierarchical layer 1 is successful, the operation part 15*d* may return to the client apparatus 20 a response (OK) indicating the successful execution of the Put request (step S329).

In the third embodiment, the rearrangement of the segmented range may be executed separately for the hierarchical layers of the segmented range. For example, the hierarchical layer 1 of the segmented range in which the hash value is greater than or equal to 10 and less than 20 may be a rearrangement target separate from the hierarchical layer 2 of the same segmented range.

The result of the rearrangement may be reflected to the arrangement information storage part 22 of the client apparatus 20 in a manner similar to that of the first embodiment. More particularly, because the rearrangement information storage part 22 of the client apparatus 20 stores only the covering server related to the hierarchical layer 1, the operation request from the client apparatus 20 may first be sent to the covering server of the hierarchical layer 1. When the covering server for the hierarchical layer 1 of the segmented range to which the data related to the operation request belongs is not the server apparatus 10 in the arrangement information storage part 12, the operation part 15 of the server apparatus 10 may return to the client apparatus 20 a response indicating that the rearrangement to the covering server is being made or has been made (that is, it is after the rearrangement), together with an error response. The operation request part 21 of the client apparatus 20 may update the rearrangement information storage part 22 based on the response received from the server apparatus 10.

In the third embodiment, the arrangement information storage part 22 of the client apparatus 20 may store the covering server for each of the hierarchical layers (hierarchical layers 1 and 2), with respect to each segmented range. In other words, the arrangement information storage part 22 may have a structure in which the item (or column) of the version is removed from FIG. 21, for example.

In this case, the operation request part 21 of the client apparatus 20 may first send an operation request with respect to the covering server of the hierarchical layer 1, as described above in conjunction with FIGS. 24 and 25. Alternatively, the sending destination of the first operation request may be the covering server of the hierarchical layer 2. Furthermore, the operation requests may be sent simultaneously (or in parallel) to the covering servers of the hierarchical layers 1 and 2, respectively.

As described above, according to the third embodiment, effects similar to those obtainable by the first embodiment and the second embodiment may be obtained in the case in which the data storage part 11 has a plurality of hierarchical layers.

In the described embodiments, the server apparatus 10 may be an example of the data management apparatus. The data storage part 11 may be an example of a first storage part or means. The transfer part 163 may be an example of a communicating part or means. The arrangement information storage part 12 may be an example of a second storage part or means. The operation part 15 may be an example of a control part or means. The covering range information storage part 14 may be an example of a third storage part or means. The server information storage part 13 may be an example of a fourth storage part or means. The segmenting part 181 may be an example of a segmenting part or means. The integrating part 182 may be an example of an integrating part or means.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data management apparatus operable in a distributed management system to distributively manage data, comprising:
   a first storage configured to store key information in which a hash value that is obtained by applying a predetermined hash function to the key information belongs to a first range of a hash space, and data corresponding to the key information, in a related manner;
   a second storage configured to store identification information of another data management apparatus within the distributed management system in correspondence with a certain range of the hash space, when executing a changing process, so that the identification information of each data management apparatus within the distributed management system is stored in the second storage for each range of the hash space; and
   a processing unit configured to execute a process including
      first sending specific data included in the data stored in the first storage and key information corresponding to the specific data to the other data management apparatus, when executing the changing process to change a storage destination of the specific data in which a hash value that is obtained by applying the predetermined hash function to corresponding key information belongs to the certain range, from the data management apparatus to the other data management apparatus; and
      second sending the identification information of the other data management apparatus stored in correspondence with the certain range to a request source of an operation request, when the operation request with respect to data corresponding to first key information is received after the changing process and a hash value that is obtained by applying the predetermined hash function to the first key information belongs to the certain range,
   wherein a number of ranges into which the hash space is segmented is greater than a total number of data management apparatuses, including the data management apparatus and the other data management apparatus, provided within the distributed management system, and
   wherein the changing process changes a covering range of the data management apparatus in order to change a data arrangement that is biased to at least one range within the covering range.

2. The data management apparatus as claimed in claim 1, wherein the process further includes
   when the certain range is narrower than the first range, storing in the second storage the identification information of the data management apparatus in correspondence with a second range that belongs to the first range but not to the certain range and includes all hash values that are obtained by applying the predetermined hash function to key information corresponding to data whose storage destination is the data management apparatus even after executing the changing process,
   wherein, when an operation request with respect to data corresponding to second key information is received after the changing process, the second sending reads from the first storage the data corresponding to the second key information and sends the read data to a request source of the operation request with respect to the data corresponding to the second key information when a hash value that is obtained by applying the predetermined hash function to the second key information belongs to the second range.

3. The data management apparatus as claimed in claim 1, further comprising:
   a third storage configured to store information indicating an amount of data, for each range of hash values that are obtained by applying the predetermined hash function to the key information; and
   a fourth storage configured to store a vacant capacity of each storage region corresponding to the identification information of each of a plurality of data management apparatuses,
   wherein the first sending sends the specific data and the key information corresponding to the specific data to the other data management apparatus, when executing the changing process to change the storage destination of the specific data in which the hash value that is obtained by applying the predetermined hash function to the corresponding key information belongs to the certain range in which an amount of corresponding data is large relative to other ranges, from the data management apparatus to the other data management apparatus having a vacant capacity greater than that of the data management apparatus.

4. The data management apparatus as claimed in claim 1, wherein, when a write request related to the specific data belonging to the certain range is received during or after the changing process, the second sending sends the identification information of the other data management apparatus to a request source of the write request.

5. The data management apparatus as claimed in claim 1, wherein, when an acquisition request related to the specific data belonging to the certain range is received during or after the changing process, the second sending sends the specific data to a request source of the acquisition request when the specific data is not sent to the other data management apparatus, and sends the identification data of the other data management apparatus to the request source of the acquisition request when the specific data is sent to the other data management apparatus.

6. The data management apparatus as claimed in claim 3, wherein the process further includes
segmenting a range in which an amount of data is large relative to other ranges, within the range corresponding to the data management apparatus, based on the information stored in the third storage, and updating the information stored in the third storage and the second storage based on a result of the segmenting.

7. The data management apparatus as claimed in claim 3, wherein the process further includes
integrating a plurality of ranges in which an amount of data is small relative to other ranges, within the range corresponding to the data management apparatus, based on the information stored in the third storage, and updating the information stored in the third storage and the second storage based on a result of the integrating.

8. The data management apparatus as claimed in claim 1, wherein
the first storage includes a plurality of hierarchical layers according to access performances,
the process further includes moving data from a first hierarchical layer to a second hierarchical layer according to an operation frequency on the data, and
the second storage stores the identification information of the data management apparatus in correspondence with the range and the hierarchical layers.

9. A data management system comprising:
a plurality of data management apparatuses communicatable via a network,
wherein each of the plurality of data management apparatuses is formed by the data management apparatus as claimed in claim 1.

10. A data management method for a distributed management system that distributively manages data, implemented in a computer of a data management apparatus, to cause the computer to perform a process comprising:
storing, in a first storage, key information in which a hash value that is obtained by applying a predetermined hash function to the key information belongs to a first range of a hash space, and data corresponding to the key information, in a related manner;
first sending specific data included in the data stored in the first storage and key information corresponding to the specific data to another data management apparatus within the distributed management system, when executing a changing process to change a storage destination of the specific data in which a hash value that is obtained by applying the predetermined hash function to corresponding key information belongs to a certain range of the hash space, from the data management apparatus to the other data management apparatus, wherein a number of ranges into which the hash space is segmented is greater than a total number of data management apparatuses, including the data management apparatus and the other data management apparatus, provided within the distributed management system, and the changing process changes a covering range of the data management apparatus in order to change a data arrangement that is biased to at least one range within the covering range;
storing, in a second storage, identification information of the other data management apparatus in correspondence with the certain range, when executing the changing process, so that the identification information of each data management apparatus within the distributed management system is stored in the second storage for each range of the hash space; and
second sending the identification information of the other data management apparatus stored in correspondence with the certain range to a request source of an operation request, when the operation request with respect to data corresponding to first key information is received after the changing process and a hash value that is obtained by applying the predetermined hash function to the first key information belongs to the certain range.

11. The data management method as claimed in claim 10, wherein the process further comprises
when the certain range is narrower than the first range, storing in the second storage the identification information of the data management apparatus in correspondence with a second range that belongs to the first range but not to the certain range and includes all hash values that are obtained by applying the predetermined hash function to key information corresponding to data whose storage destination is the data management apparatus even after executing the changing process,
wherein, when an operation request with respect to data corresponding to the second key information is received after the changing process, the second sending reads from the first storage the data corresponding to the second key information and sends the read data to a request source of the operation request with respect to the data corresponding to the second key information when a hash value that is obtained by applying the predetermined hash function to the second key information belongs to the second range.

12. The data management method as claimed in claim 10, wherein the process further comprises:
storing, in a third storage, information indicating an amount of data, for each range of hash values that are obtained by applying the predetermined hash function to the key information; and
storing, in a fourth storage, a vacant capacity of each storage region corresponding to the identification information of each of a plurality of data management apparatuses,
wherein the first sending sends the specific data and the key information corresponding to the specific data to the other data management apparatus, when executing the changing process to change the storage destination of the specific data in which the hash value that is obtained by applying the predetermined hash function to the corresponding key information belongs to the certain range in which an amount of corresponding data is large relative to other ranges, from the data management apparatus to the other data management apparatus having a vacant capacity greater than that of the data management apparatus.

13. A non-transitory computer-readable storage medium having stored therein a program for causing a computer of a data management apparatus to execute a process in a distributed management system that distributively manages data, the process comprising:
storing, in a first storage, key information in which a hash value that is obtained by applying a predetermined hash function to the key information belongs to a first range of a hash space, and data corresponding to the key information, in a related manner;
first sending specific data included in the data stored in the first storage and key information corresponding to the specific data to another data management apparatus within the distributed management system, when executing a changing process to change a storage destination of the specific data in which a hash value that is obtained by applying the predetermined hash function to corresponding key information belongs to a certain range of the hash space, from the data management apparatus to the other data management apparatus, wherein a number of ranges into which the hash space is segmented is greater than a total number of data management apparatuses, including the data management apparatus and the other data management apparatus, provided within the distributed management system, and the changing process changes a covering range of the data management apparatus in order to change a data arrangement that is biased to at least one range within the covering range;

storing, in a second storage, identification information of the other data management apparatus in correspondence with the certain range, when executing the changing process, so that the identification information of each data management apparatus within the distributed management system is stored in the second storage for each range of the hash space; and second sending the identification information of the other data management apparatus stored in correspondence with the certain range to a request source of an operation request, when the operation request with respect to data corresponding to first key information is received after the changing process and a hash value that is obtained by applying the predetermined hash function to the first key information belongs to the certain range.

14. The non-transitory computer-readable storage medium as claimed in claim 13, wherein the process further comprises:

when the certain range is narrower than the first range, storing in the second storage the identification information of the data management apparatus in correspondence with a second range that belongs to the first range but not to the certain range and includes all hash values that are obtained by applying the predetermined hash function to key information corresponding to data whose storage destination is the data management apparatus even after executing the changing process, wherein, when an operation request with respect to data corresponding to the second key information is received after the changing process, the second sending reads from the first storage the data corresponding to the second key information and sends the read data to a request source of the operation request with respect to the data corresponding to the second key information when a hash value that is obtained by applying the predetermined hash function to the second key information belongs to the second range.

15. The non-transitory computer-readable storage medium as claimed in claim 13, wherein the process further comprises:

storing, in a third storage, information indicating an amount of data, for each range of hash values that are obtained by applying the predetermined hash function to the key information; and storing, in a fourth storage, a vacant capacity of each storage region corresponding to the identification information of each of a plurality of data management apparatuses, wherein the first sending sends the specific data and the key information corresponding to the specific data to the other data management apparatus, when executing the changing process to change the storage destination of the specific data in which the hash value that is obtained by applying the predetermined hash function to the corresponding key information belongs to the certain range in which an amount of corresponding data is large relative to other ranges, from the data management apparatus to the other data management apparatus having a vacant capacity greater than that of the data management apparatus.

16. The non-transitory computer-readable storage medium as claimed in claim 13, wherein, when a write request related to the specific data belonging to the certain range is received during or after the changing process, the second sending sends the identification information of the other data management apparatus to a request source of the write request.

17. The non-transitory computer-readable storage medium as claimed in claim 13, wherein, when an acquisition request related to the specific data belonging to the certain range is received during or after the changing process, the second sending sends the specific data to a request source of the acquisition request when the specific data is not sent to the other data management apparatus, and sends the identification data of the other data management apparatus to the request source of the acquisition request when the specific data is sent to the other data management apparatus.

18. The non-transitory computer-readable storage medium as claimed in claim 15, wherein the process further comprises:

segmenting a range in which an amount of data is large relative to other ranges, within the range corresponding to the data management apparatus, based on the information stored in the third storage, and updating the information stored in the third storage and the second storage based on a result of the segmenting.

19. The non-transitory computer-readable storage medium as claimed in claim 15, wherein the process further comprises:

integrating a plurality of ranges in which an amount of data is small relative to other ranges, within the range corresponding to the data management apparatus, based on the information stored in the third storage, and updating the information stored in the third storage and the second storage based on a result of the integrating.

20. The non-transitory computer-readable storage medium as claimed in claim 13, wherein the storing in the first storage includes storing a plurality of hierarchical layers according to access performances, the process further comprises moving data from a first hierarchical layer to a second hierarchical layer according to an operation frequency on the data, and the storing in the second storage includes storing the identification information of the data management apparatus in correspondence with the range and the hierarchical layers.

* * * * *